US010628468B2

(12) United States Patent
Bendig et al.

(10) Patent No.: US 10,628,468 B2
(45) Date of Patent: Apr. 21, 2020

(54) SINGLE OR MULTI-CHOICE DATA PRESENTATION THROUGH COLLABORATION DATABASE SERVICE

(71) Applicant: MICROSOFT TECHNOLOGY LICENSING, LLC, Redmond, WA (US)

(72) Inventors: Krista Bendig, Redmond, WA (US); Krunal Sheth, Redmond, WA (US); Travis Eby, Redmond, WA (US); Raul Clouse, Redmond, WA (US); Scott McFadden, Redmond, WA (US); Reed Pankhurst, Redmond, WA (US); Wei Wei, Redmond, WA (US); Daniel McAllister, Redmond, WA (US); Petr Slavik, Redmond, WA (US); Mark Peterson, Redmond, WA (US); Chris Seitzinger, Redmond, WA (US); Harjinder Pal Singh Raheja, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 648 days.

(21) Appl. No.: 15/197,788

(22) Filed: Jun. 30, 2016

(65) Prior Publication Data
US 2017/0139884 A1 May 18, 2017

Related U.S. Application Data

(60) Provisional application No. 62/255,515, filed on Nov. 15, 2015.

(51) Int. Cl.
*G06F 16/332* (2019.01)
*G06F 16/22* (2019.01)
(Continued)

(52) U.S. Cl.
CPC ........ *G06F 16/3322* (2019.01); *G06F 3/0482* (2013.01); *G06F 3/04812* (2013.01);
(Continued)

(58) Field of Classification Search
CPC ............. G06F 16/3322; G06F 3/04817; G06F 3/0482; G06F 16/951; G06F 17/245;
(Continued)

(56) References Cited

U.S. PATENT DOCUMENTS 4,484,826 A 11/1984 Horn et al.
5,588,099 A 12/1996 Mogilevsky et al.
(Continued)

FOREIGN PATENT DOCUMENTS

EP 2891970 A1 7/2015
WO 9933007 A1 7/1999

OTHER PUBLICATIONS

Fuchs, et al., "Collaborative Data Analysis with Smart Tangible Devices", In Proceedings of International Society for Optics and Photonics, Dec. 23, 2013, 15 pages.
(Continued)

*Primary Examiner* — Andrew L Tank
(74) *Attorney, Agent, or Firm* — Newport IP, LLC; Benjamin A. Keim

(57) ABSTRACT

A collaboration database service may allow users to create, edit, and share collaborative content on custom databases, and may also integrate and interoperate with various productivity applications. For example, a collaboration database engine of the service may detect creation or modification of a table through an application associated with the service. In response to a request to add a choice type column to the table, the engine may automatically select, provide, and enable modification of a set of symbols and associated text values corresponding to choices. The engine may then
(Continued)

provide the choice type column for display within the table such that each cell of the choice type column is automatically and/or manually populated with at least one of the choices. The choice may be represented by a symbol and/or associated text value from the modified set of symbols and associated text values corresponding to the choice.

20 Claims, 20 Drawing Sheets

(51) Int. Cl.
| | | |
|---|---|---|
| G06F 16/25 | (2019.01) | |
| G06F 16/951 | (2019.01) | |
| G06F 17/24 | (2006.01) | |
| G06F 3/0481 | (2013.01) | |
| G06F 16/176 | (2019.01) | |
| G06Q 10/10 | (2012.01) | |
| G06F 16/93 | (2019.01) | |
| G06F 3/0482 | (2013.01) | |
| G06F 16/2458 | (2019.01) | |

(52) U.S. Cl.
CPC .......... *G06F 16/176* (2019.01); *G06F 16/221* (2019.01); *G06F 16/2282* (2019.01); *G06F 16/2471* (2019.01); *G06F 16/252* (2019.01); *G06F 16/93* (2019.01); *G06F 16/951* (2019.01); *G06F 17/245* (2013.01); *G06Q 10/101* (2013.01)

(58) Field of Classification Search
CPC ............... G06F 16/2282; G06F 16/252; G06F 16/9038; G06F 17/246; G06F 16/176; G06F 16/221; G06F 16/93; G06F 16/2471; G06F 3/04812; G06F 10/101; G06Q 10/101

See application file for complete search history.

(56) References Cited

U.S. PATENT DOCUMENTS

| | | | |
|---|---|---|---|
| 5,721,912 A | 2/1998 | Stepczyk et al. | |
| 5,808,914 A | 9/1998 | Shin et al. | |
| 5,950,190 A | 9/1999 | Yeager et al. | |
| 6,014,138 A | 1/2000 | Cain et al. | |
| 6,044,383 A | 3/2000 | Suzuki et al. | |
| 6,055,550 A | 4/2000 | Wallack | |
| 6,208,340 B1 | 3/2001 | Amin et al. | |
| 6,232,984 B1 | 5/2001 | Chuah et al. | |
| 6,279,008 B1 | 8/2001 | Tung Ng et al. | |
| 6,295,550 B1 | 9/2001 | Choung et al. | |
| 6,639,611 B1 | 10/2003 | Leduc | |
| 6,661,417 B1 | 12/2003 | Cheng | |
| 7,089,504 B1 | 8/2006 | Froloff | |
| 7,143,339 B2 | 11/2006 | Weinberg et al. | |
| 7,167,731 B2 | 1/2007 | Nelson | |
| 7,370,290 B2 | 5/2008 | Grossman et al. | |
| 7,379,075 B2 | 5/2008 | Opstad et al. | |
| 7,523,395 B1 | 4/2009 | Namait et al. | |
| 7,543,237 B2 | 6/2009 | Kontny et al. | |
| 7,810,033 B2 | 10/2010 | Cordes et al. | |
| 7,853,961 B2 | 12/2010 | Nori et al. | |
| 8,046,677 B2 | 10/2011 | Eischeid | |
| 8,065,658 B1 | 11/2011 | Bali et al. | |
| 8,312,367 B2 | 11/2012 | Foster | |
| 8,386,609 B2 | 2/2013 | Anand et al. | |
| 8,484,560 B2 | 7/2013 | Vuong et al. | |
| 8,484,562 B2 | 7/2013 | Schorsch | |
| 8,610,718 B2 | 12/2013 | Suntinger et al. | |
| 8,615,707 B2 | 12/2013 | Fortuna et al. | |
| 8,626,795 B2 | 1/2014 | Jacobson et al. | |
| 8,938,690 B1 | 1/2015 | Khouri et al. | |
| 9,087,320 B2 | 7/2015 | Goldman et al. | |
| 9,202,249 B1 | 12/2015 | Cohen et al. | |
| 9,244,802 B2 | 1/2016 | Yalovsky et al. | |
| 2002/0047858 A1 | 4/2002 | Bayliss et al. | |
| 2002/0116417 A1 | 8/2002 | Weinberg et al. | |
| 2003/0028560 A1 | 2/2003 | Kudrolli et al. | |
| 2003/0142147 A1 | 7/2003 | Chen et al. | |
| 2003/0187716 A1 | 10/2003 | Lee | |
| 2004/0117358 A1 | 6/2004 | von kaenel et al. | |
| 2004/0122683 A1 | 6/2004 | Grossman et al. | |
| 2005/0187956 A1 | 8/2005 | Sylvester et al. | |
| 2005/0208971 A1 | 9/2005 | Pappalardo et al. | |
| 2005/0275655 A1 | 12/2005 | Stolze et al. | |
| 2005/0278282 A1* | 12/2005 | Sheridan ............... G06F 17/243 | |
| 2006/0053386 A1 | 3/2006 | Kuhl et al. | |
| 2006/0101351 A1* | 5/2006 | Cowham ............... G06Q 10/107 | |
| | | | 715/783 |
| 2006/0195476 A1 | 8/2006 | Nori et al. | |
| 2006/0230032 A1 | 10/2006 | Brankov et al. | |
| 2007/0016575 A1 | 1/2007 | Hurst-hiller et al. | |
| 2007/0136654 A1 | 6/2007 | Peters | |
| 2007/0156768 A1 | 7/2007 | Harrington et al. | |
| 2007/0208992 A1 | 9/2007 | Koren | |
| 2007/0211062 A1 | 9/2007 | Engelman et al. | |
| 2007/0288318 A1* | 12/2007 | Gupta ............... G06F 17/30864 | |
| | | | 705/14.45 |
| 2008/0028290 A1 | 1/2008 | Suwiryo | |
| 2008/0208624 A1 | 8/2008 | Morita et al. | |
| 2009/0083614 A1 | 3/2009 | Wedekind | |
| 2009/0158189 A1* | 6/2009 | Itani ................ G06Q 10/06 | |
| | | | 715/772 |
| 2010/0049683 A1 | 2/2010 | Carter | |
| 2010/0082536 A1* | 4/2010 | Cosic ............... G06F 17/3056 | |
| | | | 707/610 |
| 2010/0174734 A1 | 7/2010 | Norbauer et al. | |
| 2010/0325173 A1 | 12/2010 | Haley et al. | |
| 2011/0093471 A1 | 4/2011 | Brockway et al. | |
| 2011/0175820 A1 | 7/2011 | Toba | |
| 2011/0191303 A1 | 8/2011 | Kaufman et al. | |
| 2011/0276868 A1 | 11/2011 | Hoke et al. | |
| 2012/0117105 A1 | 5/2012 | Thomas et al. | |
| 2013/0046544 A1 | 2/2013 | Kay et al. | |
| 2013/0047093 A1 | 2/2013 | Reuschel et al. | |
| 2013/0061121 A1 | 3/2013 | Thomsen | |
| 2013/0066922 A1 | 3/2013 | Jang et al. | |
| 2013/0144855 A1 | 6/2013 | Kaul et al. | |
| 2013/0218923 A1 | 8/2013 | Kaul et al. | |
| 2014/0012922 A1 | 1/2014 | Wu | |
| 2014/0032486 A1 | 1/2014 | Sharma et al. | |
| 2014/0059496 A1 | 2/2014 | White et al. | |
| 2014/0108906 A1 | 4/2014 | Kelley et al. | |
| 2014/0164944 A1 | 6/2014 | Sivakumar et al. | |
| 2014/0181703 A1* | 6/2014 | Sullivan ............... G06F 9/451 | |
| | | | 715/762 |
| 2014/0208212 A1 | 7/2014 | Affronti et al. | |
| 2014/0237356 A1 | 8/2014 | Durga et al. | |
| 2014/0245119 A1* | 8/2014 | Barrus ............... G06F 17/243 | |
| | | | 715/224 |
| 2014/0245120 A1* | 8/2014 | Schwartz ........... G06K 9/00402 | |
| | | | 715/226 |
| 2014/0310649 A1 | 10/2014 | Bernstein et al. | |
| 2014/0317116 A1 | 10/2014 | Shah et al. | |
| 2014/0344304 A1 | 11/2014 | Topatan et al. | |
| 2014/0379699 A1 | 12/2014 | Blyumen | |
| 2015/0046530 A1 | 2/2015 | Mieritz et al. | |
| 2015/0169733 A1 | 6/2015 | Motamedi et al. | |
| 2015/0331578 A1 | 11/2015 | Keslin et al. | |
| 2016/0248837 A1 | 8/2016 | Cai et al. | |
| 2017/0010771 A1 | 1/2017 | Bernstein et al. | |
| 2017/0118267 A1 | 4/2017 | Philippov et al. | |
| 2017/0139890 A1 | 5/2017 | Bendig et al. | |
| 2017/0139927 A1 | 5/2017 | Bendig et al. | |
| 2017/0139958 A1 | 5/2017 | Bendig et al. | |

(56) References Cited

U.S. PATENT DOCUMENTS

2017/0140047 A1 5/2017 Bendig et al.
2017/0364575 A9 12/2017 Kohlmeier et al.

OTHER PUBLICATIONS

"About Fusion Tables", Retrieved From: https://support.google.com/fusiontables/answer/2571232, Oct. 29, 2012, 4 Pages.
"Adding People to a Board", Retrieved From: http://help.trello.com/article/717-adding-people-to-a-board, Sep. 3, 2015, 4 Pages.
"Collaborative Database", Retrieved From: https://www.eda.europa.eu/what-we-do/activities/activities-search/collaborative-database, Mar. 11, 2015, 3 Pages.
"Create with Fusion Tables", Retrieved From: https://support.google.com/fusiontables/answer/184641?hl=en, Feb. 21, 2013, 2 Pages.
"Design Your Database Online", Retrieved From: https://www.vertabelo.com/, Sep. 9, 2014, 5 Pages.
"Force.com: A Comprehensive Look at the World's Premier Cloud-Computing Platform", In White Paper of SalesForce.com, Aug. 6, 2009, 30 Pages.
"Make an Online Collaborative Database in a Few Minutes", Retrieved From: https://web.archive.org/web/20130410042142/http://acropora.bio.mq.edu.au/resources/make-an-online-collaborative-database-in-a-few-minutes/, Apr. 10, 2013, 5 Pages.
"Managing Users", Retrieved From: https://www.zoho.com/reports/help/managing-users.html, Retrieved Date: May 30, 2016, 4 Pages.
"ReportPlus v4.0 User Guide", Retrieved From: http://dl.infragistics.com/reportplus/help/ReportPlus-v4.0-UserGuide.html, Nov. 1, 2015, 106 Pages.
"Non Final Office Action Issued in U.S. Appl. No. 15/196,082", dated Sep. 27, 2018, 22 Pages.
"Non Final Office Action Issued in U.S. Appl. No. 15/196,087", dated Oct. 29, 2018, 18 Pages.
"Non Final Office Action Issued in U.S. Appl. No. 15/198,236", dated Oct. 3, 2018, 16 Pages.
Anslow, Craig, "Multi-touch Table User Interfaces for Collaborative Visual Software Analytics", A Thesis Submitted in Partial Fulfillment of the Requirements of the Victoria University of Wellington for the Degree of Doctor of Philosophy, Sep. 2010, 149 Pages.
Bort, Julie, "Google Introduces Fusion Tables for Database Collaboration, Visualization", Retrieved From: http://www.networkworld.com/article/2236073/opensource-subnet/google-introduces-fusion-tables-for-database-collaboration--visualization.html, Jun. 11, 2009, 2 Pages.

Csinger, Andrew, "User Models for Intent-Based Authoring", A Thesis Submitted in Partial Fulfillment of the Requirements of the University of British Columbia for the Degree of Doctor of Philosophy, Nov. 1995, 202 Pages.
Joe, "CRM 2011 Actionable Goal Charts and Dashboards", Retrieved From: http://www.powerobjects.com/2011/04/25/crm-2011-actionable-goal-charts-and-dashboards/, Apr. 25, 2011, 8 Pages.
Lin, Xiaofan, "Active Document Layout Synthesis", In Proceedings of Eighth International Conference on Document Analysis and Recognition, Aug. 31, 2005, 5 Pages.
"International Search Report and Written Opinion Issued in PCT Application No. PCT/US2016/060761", dated Dec. 14, 2016, 8 Pages.
"International Search Report and Written Opinion Issued in PCT Application No. PCT/US2016/060764", dated Dec. 20, 2016, 7 Pages.
"International Preliminary Report on Patentability Issued in PCT Application No. PCT/US2016/060766", dated Jan. 31, 2018, 7 Pages.
"International Search Report and Written Opinion for PCT Application No. PCT/US2016/060766", dated Dec. 19, 2016, 11 Pages.
"Second Written Opinion Issued in PCT Application No. PCT/US2016/060766", dated Sep. 13, 2017, 6 Pages.
"International Search Report and Written Opinion Issued in PCT Application No. PCT/US2016/060767", dated Dec. 19, 2016, 6 Pages.
Red, Paul, "How to Create Customized Dashboards for your Users", Retrieved From: https://www.docebo.com/knowledge-base/customized-users-dashboards/, Retrieved Date: May 30, 2016, 26 Pages.
Strom, David, "Simple Online Database Collaboration", Retrieved From: http://www.itworld.com/article/2826377/enterprise-software/simple-online-database-collaboration.html, Mar. 18, 2010, 2 Pages.
"International Search Report and Written Opinion Issued in PCT Application No. PCT/US2016/060762", dated Dec. 20, 2016, 11 Pages.
"Notice of Allowance Issued in U.S. Appl. No. 15/196,082", dated Mar. 18, 2019, 12 Pages.
"Final Office Action Issued in U.S. Appl. No. 15/198,236", dated Apr. 29, 2019, 19 Pages.
"Non Final Office Action Issued in U.S. Appl. No. 15/198,375", dated Jan. 11, 2019, 11 Pages.
"Final Office Action Issued in U.S. Appl. No. 15/198,375", dated Aug. 2, 2019, 13 Pages.
"Final Office Action Issued in U.S. Appl. No. 15/198,375", dated Oct. 22, 2019, 14 Pages.
"Non Final Office Action Issued in U.S. Appl. No. 15/198,236", dated Dec. 12, 2019, 23 Pages.

* cited by examiner

SINGLE OR MULTI-CHOICE DATA PRESENTATION THROUGH COLLABORATION DATABASE SERVICE

CROSS-REFERENCE TO RELATED APPLICATION

This application is a non-provisional application under 35 U.S.C. § 119(e) of U.S. Provisional Application No. 62/255,515 filed on Nov. 15, 2015. The U.S. Provisional application is herein incorporated by reference in its entirety.

BACKGROUND

Productivity applications, such as word-processing, spreadsheet, presentation, and notebook applications, among other examples, enable users to create, edit, and share content, where formatting is used to convey meaning of the content. Increasingly, productivity applications are being executed in collaborative environments, such that multiple users co-authoring a document or file, for example, may more efficiently edit and share the updated content among one another.

Databases, unlike productivity applications, comprise a collection of custom entities that enable a user to configure the actual semantics of content rather than using formatting to convey meaning. However, databases are typically not approachable to an average user and are not optimized for collaborative editing and data sharing at an end user level.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a collaboration database service that may allow end users to create, edit, and share collaborative content on custom databases (for example, tables, presentations, word processing documents, spreadsheets, etc.). The collaboration database service may not only provide easy creation and sharing of various databases across devices, but may also integrate and interoperate with various productivity applications workloads. For example, a collaboration database engine of the collaboration database service may be configured to detect creation or modification of a table through an application associated with the collaboration database service. The table may include one or more columns and rows that are entities of the table. In response to a request to add a choice type column to the table, the collaboration database engine may be configured to automatically select a set of symbols and associated text values corresponding to choices for display through the application, where the choices may be sub-entities of the table contained within the choice type column. The collaboration database engine may then be configured to enable the set of symbols and associated text values to be modified, and provide the choice type column for display within the table such that each cell of the choice type column is populated with at least one of the choices. The choice may be represented by a symbol and/or associated text value from the modified set of symbols and associated text values that corresponds to the choice.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
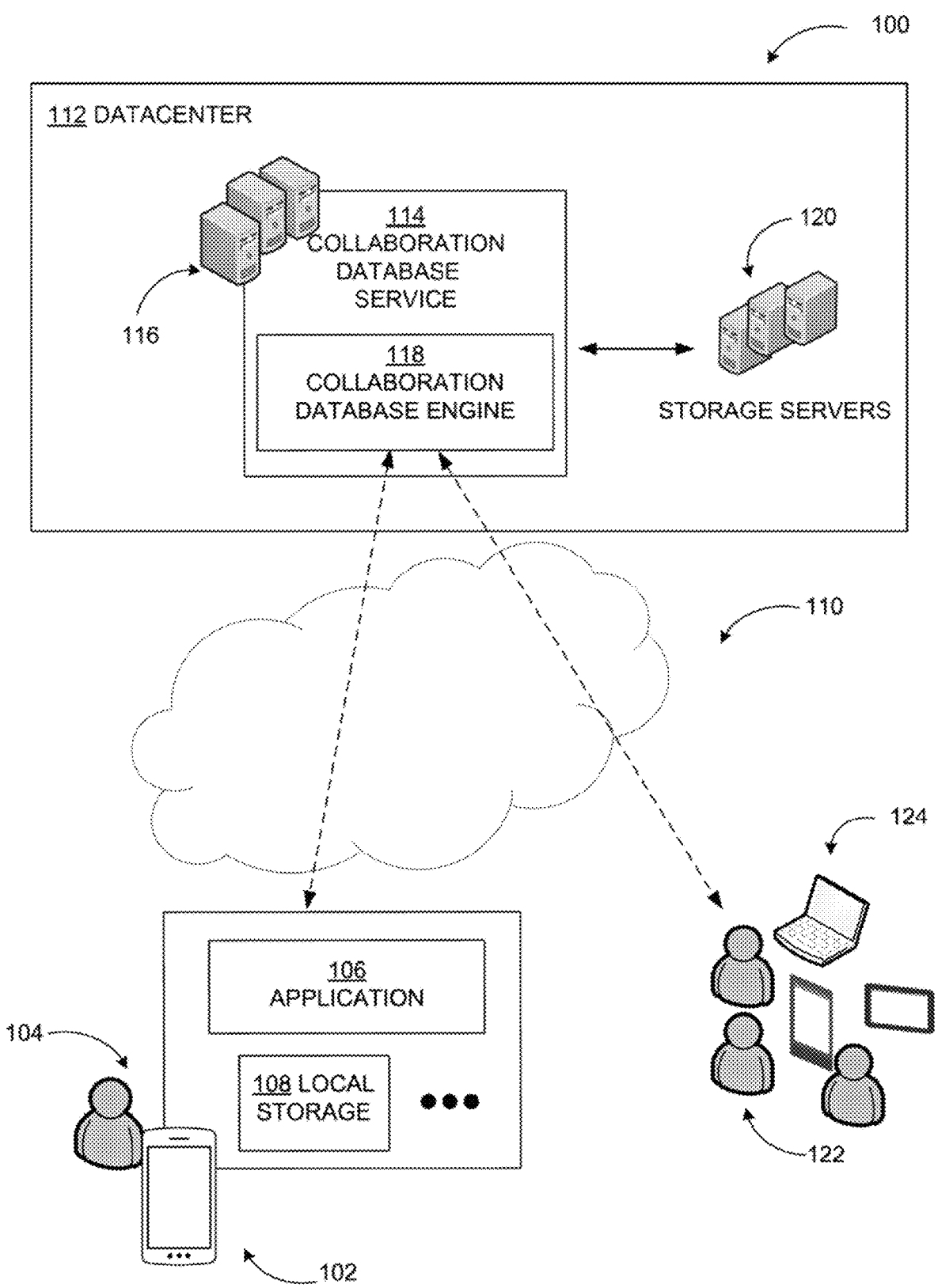
FIG. 1 includes an example network environment where a system for single and/or multi-choice data presentation through a collaboration database service may be implemented.

As briefly described above, a collaboration database service comprising a collaboration database engine may be configured to present single and/or multi-choice data across various devices. The collaboration database engine may be configured to detect creation or modification of a table through an application associated with the collaboration database service, where the application may be a collaboration database application or a productivity application, for example. The table may be comprised of one or more columns and rows that are entities of the table. In response to a request to add a choice type column to the table, the collaboration database engine may be configured to automatically select a set of symbols and associated text values corresponding to choices to provide for display, where the choices may be sub-entities of the table contained within the choice type column. There may be one choice, two choices, multiple choices and/or a "no choice" selection. The set of symbols and associated text values may be automatically selected based on a type of data within the table, users associated with the table, whether the choice type column is configured a single or multi-choice type column, other choice type columns contained within the table, recent modifications made to the table, and/or other tables created containing similar data, for example. The collaboration database engine may be configured to enable modification of the set of symbols and associated text values, where the modifications may be tracked to facilitate machine-based learning and subsequent adjustment in future automatic selections performed by the collaboration database engine. The collaboration database engine may then be configured to provide the choice type column for display within the table such that each cell of the choice type column is automatically and/or manually populated with at least one of the choices. The choice may be represented by a symbol and/or associated text value from the modified set of symbols and associated text values that corresponds to the choice. In some embodiments, the choice populating each cell of the choice type column may be aggregated to determine a percentage of each choice populating the cells of the choice type column to provide a more holistic view of the data represented by the table.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for single and/or multi-choice data presentation through a collaboration database service. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example network environment where a system for single and/or multi-choice data presentation through a collaboration database service may be implemented.

As illustrated in diagram 100, an example system may include a datacenter 112 hosting a collaboration database service 114 configured to enable creation and collaboration of content on custom databases. The datacenter 112 may include one or more processing servers 116, of which, at least one may be operable to execute a collaboration database engine 118 of the collaboration database service 114, among other components. The datacenter 112 may also include one or more storage servers 120 configured to manage one or more data stores comprising data associated with the collaboration database engine 118. As described herein, the collaboration database engine 118 may be implemented as software, hardware, or combinations thereof.

In some embodiments, the collaboration database service 114 may be configured to integrate and interoperate with various applications. For example, as illustrated in the diagram 100, a customer 104 may execute a thin (e.g., a web browser) or a thick (e.g., a locally installed client application) version of an application 106 through a device 102 with which the collaboration database service 114 may be configured to integrate and interoperate with over one or more networks, such as network 110. The application 106 may be a productivity application, such as a word-processing application, a spreadsheet application, a presentation application, or a notebook application, for example, such that collaborative content created through the productivity application may be shared, presented, and edited through the collaboration database service 114. Alternatively, the application 106 may be an application hosted by the collaboration database service (a collaboration database application, for example). The device 102 may include a desktop computer, a laptop computer, a tablet computer, a vehicle mount computer, a smart phone, or a wearable computing device, among other similar devices. A communication interface may facilitate communication between the collaboration database service 114 and the application 106 over the network 110.

In one embodiment, the collaboration database engine 118 may be configured to detect creation of a new table through the application 106. In another embodiment, the collaboration database engine 118 may be configured to detect modification of an existing table through the application 106, where the application 106 may have retrieved the existing table from local storage 108 of the device 102, from the data stores managed by the storage servers 120, and/or from third party storage services. The table may include one or more rows and columns producing a plurality of cells within the table, where the rows and columns may be entities of the table. The customer 104 may request to add a choice type column to the table through a user experience of the application 106. In response to the request, the collaboration database engine 118 may configure the choice type column as a single choice type column or a multi-choice type column. If configured as a single choice type column, an allowable number of choices to populate a cell of the column is zero (e.g., a "none" or "no choice" selection) or one such that no more than one choice populates the cell. If configured as a multi-choice type column, an allowable number of choices to populate a cell of the column is zero, one, or more choices such that two or more choices may populate the cell simultaneously. In an example embodiment, the collaboration database engine 118 may configure the choice type as a multi-choice type column by default. However, the customer 104 may be enabled to convert the multi-choice type column to a single choice type column if they desire.

Additionally, in response to the request, the collaboration database engine 118 may be configured to automatically select a set of symbols and associated text values corresponding to choices, where the choices may be sub-entities of the table contained within the choice type column. In one embodiment, there may be one choice such that a cell of the choice type column is either populated with the choice or with no choice. For example, a choice type column representing a status of tasks may only have one choice, "completed". If a task is completed, a corresponding cell of the choice type column for that task may be populated with "completed." If the task is not completed, the corresponding cell of the choice type column for that task may not be populated with a choice. In another embodiment, there may be two choices. For example, a column representing a completion status of tasks may have two choices, "yes" or "no" with which a cell may be populated with. In a further embodiment, there may be multiple choices. For example, a column representing a status of tasks may have multiple choices, "not started", "in progress" or "finished", among others. The set of symbols and associated text values may be automatically selected based on a type of data within the table, users associated with the table, whether the choice type column is configured a single or multi-choice type column, other choice type columns contained within the table, recent modifications made to the table, and/or other tables created containing similar data, for example. Symbols may include glyphs and/or emojis of varying shapes, sizes, colors, patterns, and types. In some embodiments, the symbols may be animated.

The collaboration database engine 118 may provide for display and enable modification of the set of symbols and associated text values through the user experience of the application 106. Example modifications may include selection of a different symbol and/or associated text value corresponding to a choice, disablement of one of a symbol and associated text value corresponding to a choice, deletion of a choice through disablement of both a symbol and associated text value corresponding to the choice to be deleted, and creation of a new choice through selection of a new symbol and associated text value corresponding to the new choice. In some embodiments, the collaboration database engine 118 may track modifications made to the set of symbols and associated text values to facilitate machine-based learning and subsequent adjustment when performing future automatic selections. For example, if each symbol from the set of symbols and associated text values is modified from a square shape to a circle shape then the collaboration database engine 118 may be more likely to automatically select symbols with a circle shape in response to future requests to add a new choice type column.

The collaboration database engine 118 may then be configured to provide the choice type column for display within the table such that each cell of the choice type column is populated with at least one of the choices. The choice may be represented by a symbol and/or associated text value from the modified set of symbols and associated text values that corresponds to the choice. In one embodiment, the collaboration database engine 118 may be configured to provide the choice type column for display within the table such that the choices are manually selectable by the customer 104 to populate each cell of the choice type column with at least one of the choices. Alternatively, the collaboration database engine 118 may be configured to provide the choice type column for display within the table such that each cell of the choice type column is automatically populated with at least one of the choices. For example, the collaboration database engine 118 may be configured to retrieve data associated with the choices from other services associated with the collaboration database service 114 through the communication interface in order to automatically populate each cell of the choice type column with a choice. The other services may include a database service, a Global Positioning Service (GPS), a scheduling service, and a presence service, for example. In an example scenario, the table may represent travel data associated with employees of a company attending a client conference. The table may include, among other columns associated with accommodations and travel details, a choice type column regarding a status of each employee's flight, where the choices may be represented by a set of symbols and associated text including "at starting location," "in route", and "at destination location," for example. The collaboration database engine 118 may be configured to retrieve data from a GPS coupled to each employees' device in order to populate each cell of the choice type column with a status of the respective employee's flight.

In some embodiments, the collaboration database engine 118 may be configured to aggregate the choices populating each cell of the choice type column to determine a percentage of each choice within the choice type column to provide a more holistic view of the data represented by the table. In an example aggregation scenario, each row of the table may represent a task of a project. The choice type column may be a single choice type column representing a status of the task, where the choices (each represented by a symbol and associated text value) include "finished", "in progress", and "not started". Each cell of the choice type column may be populated with one of the "finished", "in progress", and "not started" choices, and the collaboration database engine 118 may be configured to aggregate the choices populating the cells to determine an overall status of the project. For example, the overall status may indicate a percentage of each choice (e.g., 10% "not started," 50% "in progress", and 40% "finished") to enable a user to grasp of how close the project is to completion.

Once the collaboration database engine 118 has provided the choice type column for display within the table, the choice type column may be modified through the user experience of the application 106. For example, a title of the choice type column may be named or renamed, the choice type column may be filtered based on the choices, the choice type column may be reordered based on a preferred order of the choices, and/or the choice type column may be deleted. Once the collaboration database engine 118 has provided the choice type column for display within the table and/or following a modification of the choice type column, the updated table may be stored locally at local storage 108 of the device 102 and/or remotely at the data stores managed by the storage servers 120, or by third party storage services. The collaboration database engine 118 may also be configured to share a copy of the updated table with other customers 122 who may be collaborating on the content of the table with the customer 104 through various devices 124 associated with the other customers 122.

As described in FIG. 1, embodiments are directed to a collaboration database service that may allow end users to create, edit, and share collaborative content on custom databases as well as any other type of productivity content (presentations, word processing documents, spreadsheets, etc.). Providing a more data centric rather than the traditional formatting centric experience may allow for a malleable experience. For example, the collaboration database service may employ symbols and associated text values corresponding to choices (sub-entities) for display within a choice type column (entity) of a table to enable the most efficient presentation of single or multi-choice data across various devices. For example, the collaboration database service may automatically select a set of symbols and associated text values based on a type of data within the table, users associated with the table, whether the choice type column is configured a single or multi-choice type column, other choice type columns contained within the table, recent modifications made to the table, and/or other tables created containing similar data, among other examples. A user may be enabled to modify the set of symbols and associated text values, and any modifications made may be tracked to facilitate machine-based learning and subsequent adjustment in future automatic selections performed by the collaboration database service. Therefore, implementation of the collaboration database service may increase efficiency in user interaction, data management, and data presentation in collaborative environments.

The collaboration database service according to embodiments may not only provide easy creation and sharing of content across devices, but may also integrate and interoperate with various productivity application workloads such that collaborative content created through the productivity application may be shared, presented, and edited through the collaboration database service. Each productivity application may play a unique role, and those individual strengths may be highlighted in an example service to bring the system together. For example, databases are typically not approachable to an average user, however the average user may already be familiar and comfortable interacting with a productivity application to create, edit, and share data. Therefore, the collaboration database service may improve user interactivity by allowing users to create, edit, and view richer, faster, and more secure data without having to learn or work with complex database systems.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of applications to enable creating, editing, and sharing content among customers in collaborative environments.

Figure 2:
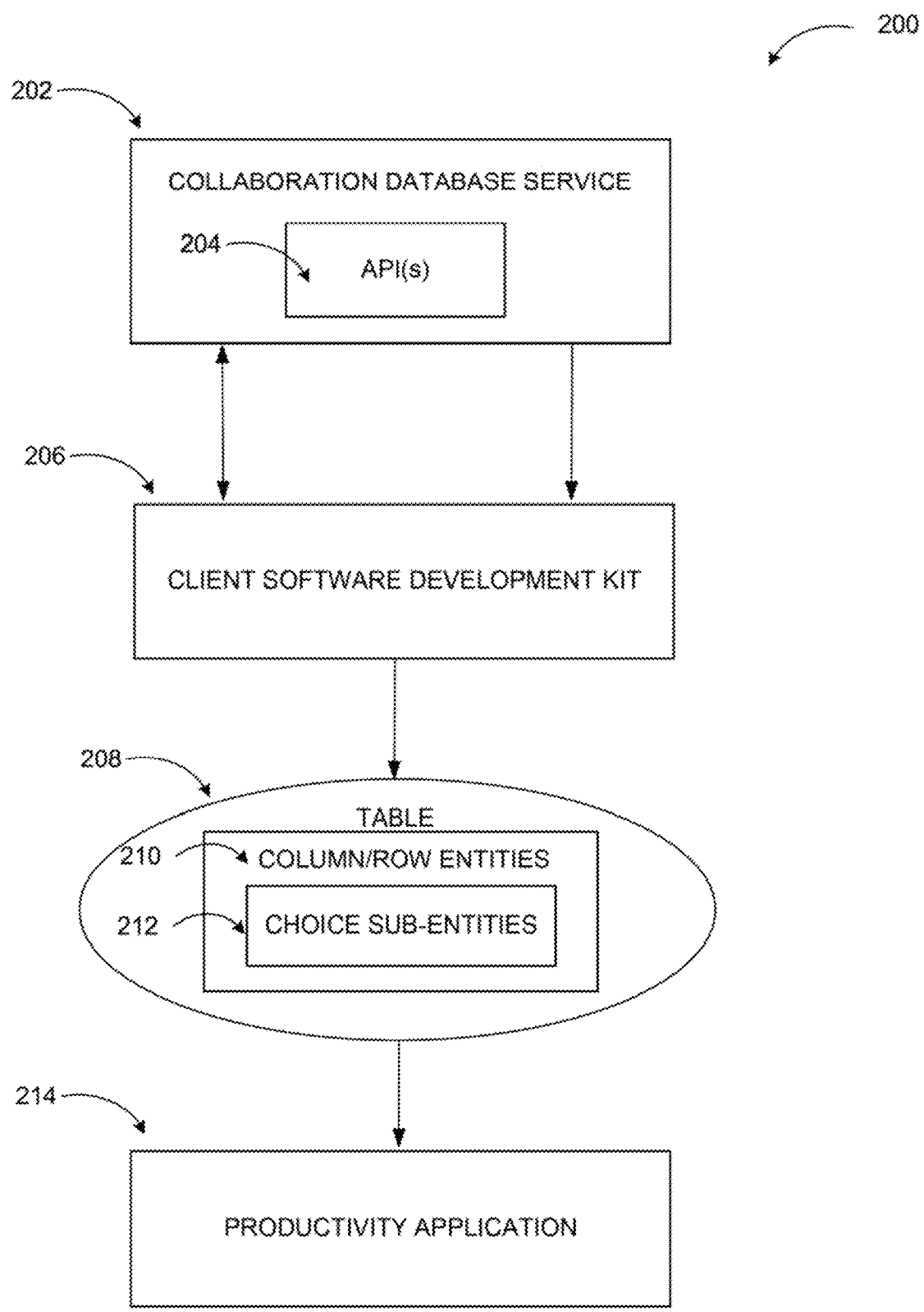
FIG. 2 includes an example infrastructure implemented for single and/or multi-choice data presentation through a collaboration database service.

FIG. 2 includes an example infrastructure implemented for single and/or multi-choice data presentation through a collaboration database service.

As shown in a diagram 200, a collaboration database service 202 may be provided to enable creation and collaboration of content on custom databases. The collaboration database service 202 may also integrate and/or interoperate with a productivity application 214 such that collaborative content created through the productivity application 214 may be shared, presented, and edited through the collaboration database service 202. The integration and/or interoperation between the collaboration database service 202 and the productivity application 214 may be enabled through a client software development kit (SDK) 206. In one example, the client SDK 206 may implement one or more application programming interfaces (APIs) 204 of the collaboration database service 202 to communicate with the productivity application 214 to achieve integration and/or interoperation.

In an example scenario, the collaboration database engine of the collaboration database service 202 may detect creation and/or modification of a table 208 through the productivity application 214. For example, a user may be creating a new table to be shared and/or edited in a collaborative environment or the user may be modifying an already existing table. The table 208 may include one or more columns and rows, where the columns and rows may be configured as entities 210 of the table. In response to a request to add a choice type column to the table 208 (that is, add another entity to the table 208), the collaboration database engine may be configured to automatically select a set of symbols and associated text values corresponding to choices to provide for display through the productivity application 214. The choices may be configured as sub-entities 212 of the table 208 contained within the choice type column. There may be one choice, two choices, multiple choices and/or a "no choice" selection.

The collaboration database engine may then be configured to enable the set of symbols and associated text values corresponding to the choices to be modified through the productivity application 214, and provide the choice type column for display within the table 208 such that each cell of the choice type column is automatically and/or manually populated with at least one of the choices. The choice may be represented by a symbol and/or associated text value from the modified set of symbols and associated text values that corresponds to the choice.

FIGS. 3A-D include user experiences illustrating an addition of a choice type column and modification of a selected set of symbols and associated text values corresponding to choices contained within the choice type column. As previously discussed, a collaboration database service may be provided to enable creation and collaboration of content on custom databases, where the collaboration database service may include a collaboration database engine. The content may be displayed through an application associated with the collaboration database service that is executed on a user device to enable interactivity with the content. The user device may have one or more input device(s) such that the user may interact with the content through a keyboard input, a mouse input, a pen input, a touch, an optically captured gesture, a voice input, a gyroscopic input, and/or an eye-tracking input, for example.

Figure 3A:
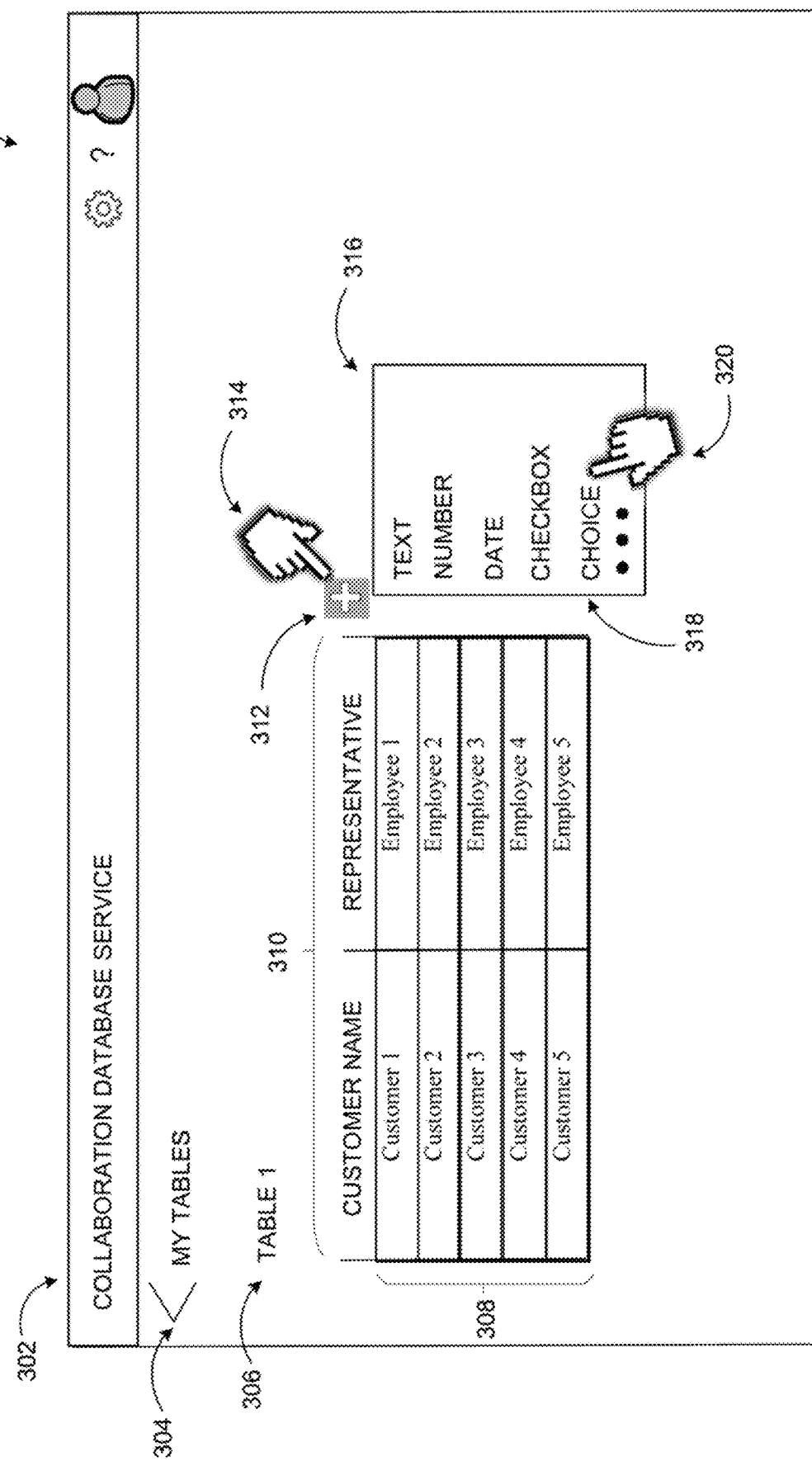
FIGS. 3A-D include user experiences illustrating an addition of a choice type column and modification of a selected set of symbols and associated text values corresponding to choices contained within the choice type column.

As shown in diagram 300A of FIG. 3A, the collaboration database service may provide a user experience 302 through the application to enable a user to create and/or modify a table 306 through a "My Tables" view 304. The application may be a collaboration database application, as illustrated, or the application may be a productivity application, such as a word-processing, spreadsheet, presentation, or notebook application. In an example scenario, the table 306 may represent sales contract data associated with a company whose employees are each a representative for a potential customer of the company. The table 306 may include one or more rows 308 and columns 310 comprising a plurality of cells, where the rows 308 and columns 310 may be configured as entities of the table 306. The columns 310 may include a customer name column and a representative column. Each of the rows 308 may represent a potential customer and an employee who is their representative. A graphical control 312 may be displayed to allow the user to add a column to the table 306. In response to a user selection 314 of the graphical control 312, a menu 316 may be displayed. The menu 316 may be a drop-down menu, a pop-up menu, a radial menu, or a fly-out menu, for example. The menu 316 may include several types of columns that may be added to the table 306, such as text, number, date, checkbox, and choice 318 type columns, among other types. A choice type column may be a single choice type column or a multi-choice type column. If configured as a single choice type column, an allowable number of choices to populate a cell of the column is zero (e.g., a "none" choice) or one choice such that no more than one choice populates the cell. If configured as a multi-choice type column, an allowable number of choices to populate a cell of the column is zero, one, or more choices such that two or more choices may populate the cell simultaneously.

Figure 3B:
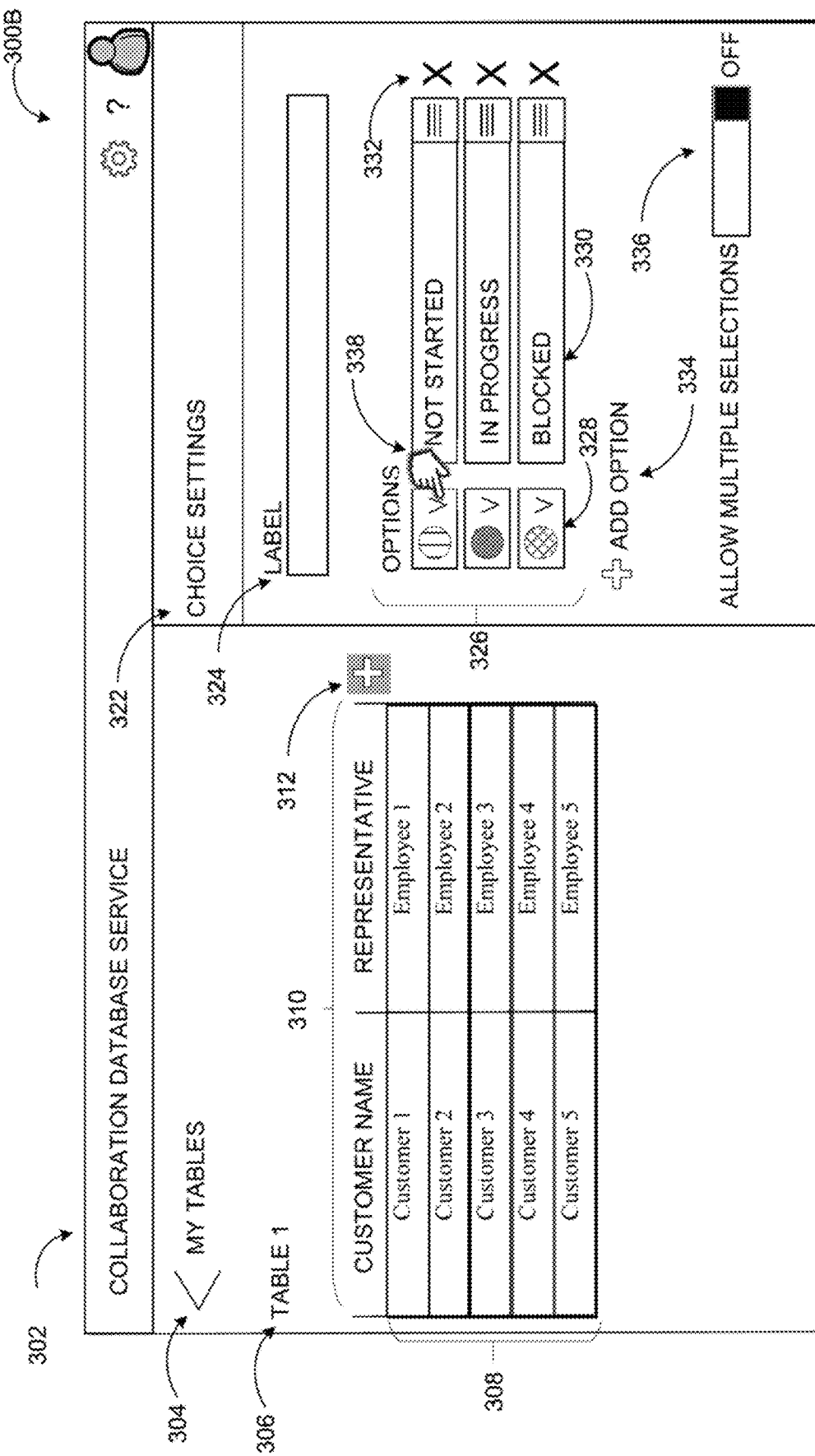

In response to a user selection 320 of a choice 318 type column from the menu 316, a "Choice Settings" view 322 may be displayed through the user experience 302, as shown in diagram 300B of FIG. 3B. The "Choice Settings" view 322 may automatically display a label 324 and choices 326 for the choice type column. The choices 326 may be configured as sub-entities of the table 304 that are contained within the choice type column. The collaboration database engine may be configured to automatically select a set of symbols 328 and associated text values 330 corresponding to the choices 326 to provide for display. The set of symbols 328 and associated text values 330 may be provided for display as default values which may be modified by the user. For example, a different symbol and/or associated text value corresponding to a choice may be selected or one of a symbol and an associated text value corresponding to a choice may be disabled. Additionally, a choice may be deleted through actuation of "X" control element 332 or disablement of both a symbol and associated text value of the choice, and a new choice may be added through actuation of an "add option" control element 334 and selection of a new symbol and new associated text value corresponding to the new choice. The "Choice Settings" view 322 may also provide an "allow multiple selections" control element 336 to enable a user to convert the choice type column from a single choice type column to a multi-choice type column or from a single choice type column to a multi-choice type column. As illustrated, the choice type column may be a single choice type column because the "allow multiple selections" control element 336 is in an off position. The control elements 332, 334, and 336 may be buttons, toggles, or other similar graphical control elements, for example.

Figure 3C:
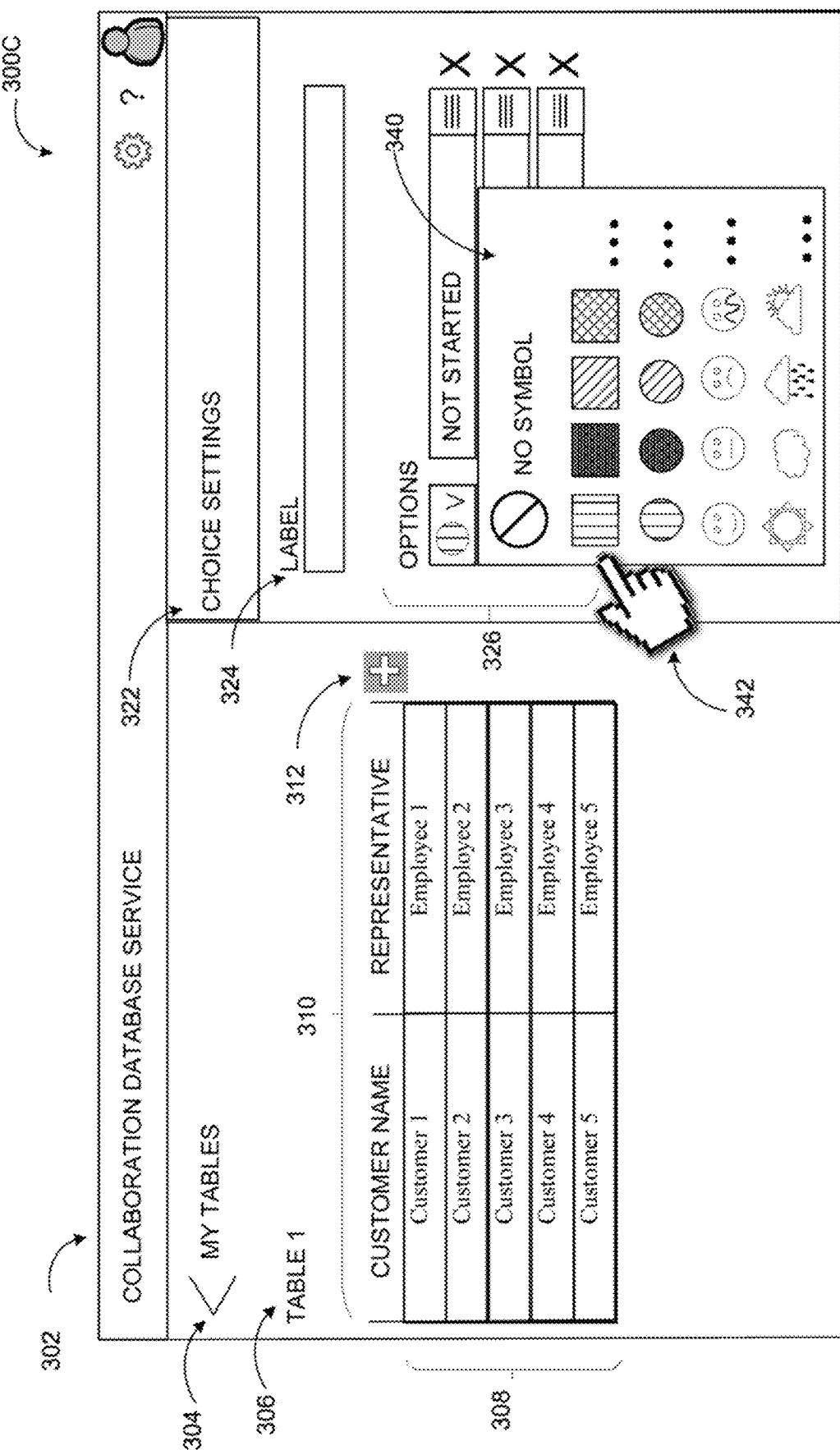

In response to a user selection 338 to modify a symbol from the set of symbols 328, a menu 340 may be displayed, as shown in diagram 300C of FIG. 3C. The menu 340 may be a drop-down menu, a pop-up menu, a radial menu, or a fly-out menu, for example. The menu 340 may include a variety of symbols for user selection 342, as well as an option to select no symbol. The symbols may be glyphs and/or emojis of varying shapes, sizes, colors, patterns, and types, as illustrated. In some embodiments, the symbols may be animated.

Figure 3D:
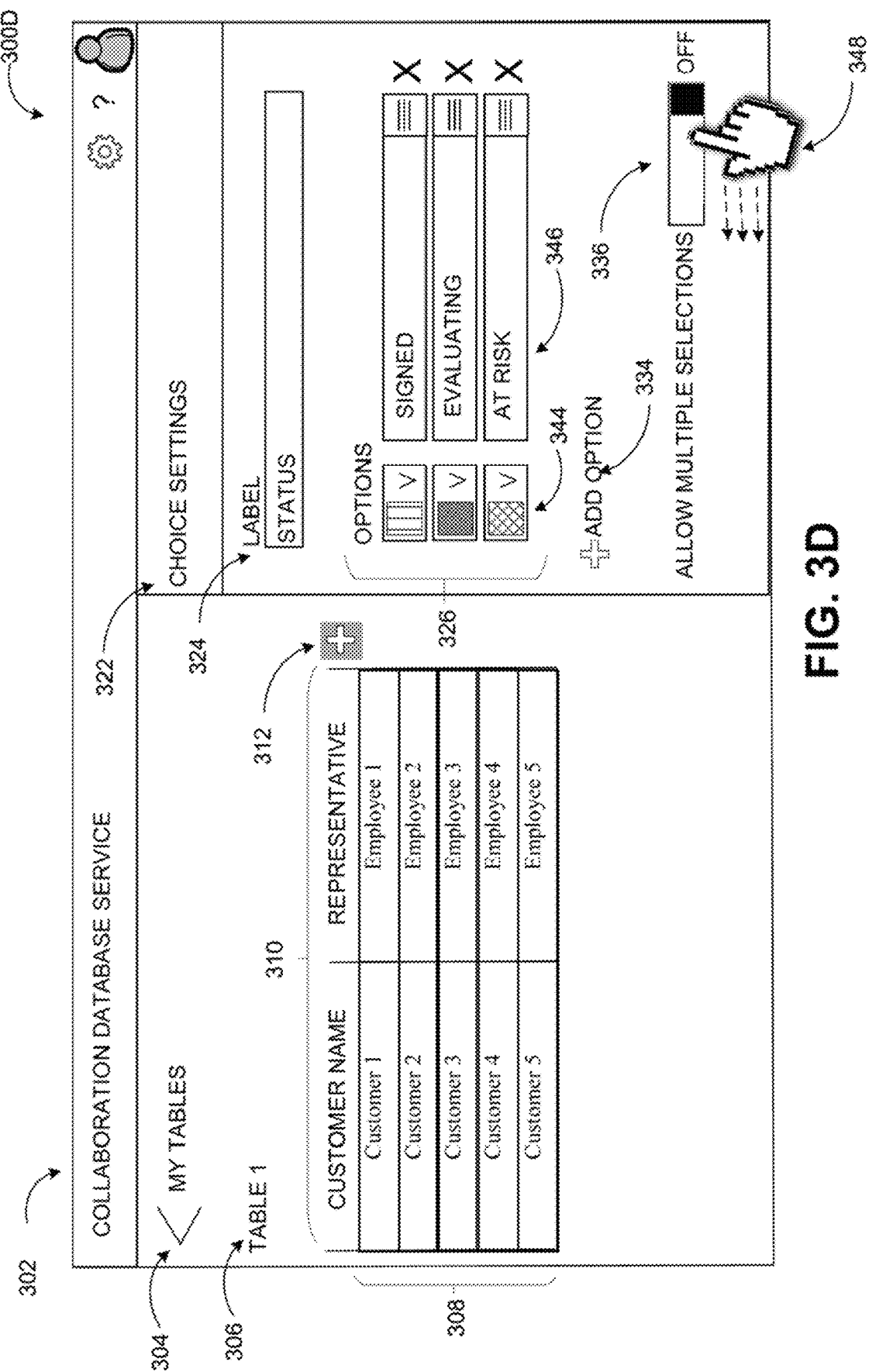

In addition to modifying one or more symbols, the user may also modify associated text values from the set of symbols 328 and associated text values 330 to produce a modified set of symbols 344 and associated text values 346, as shown in diagram 300D of FIG. 3D. Returning to the example scenario presented above, the user may modify the associated text values to correspond to the data wished to be represented in the choice type column. For example, the choice type column may be added to indicate a status of a sales contract with the potential customers of the company. Thus, the modified associated text values may be one of "signed", "evaluating" or "at risk." Because a sales contract with a potential customer may both be in an evaluation stage and at risk, the user may wish to convert the single choice type column to a multi-choice type column such that each cell of the table may be populated with both "evaluating" or "at risk" choices if applicable. The conversion may occur in response to a user toggle 348 of the "allow multiple selections" control element 336 from the off position to an on position. In some embodiments, in response to the user toggle 348, a warning message may be displayed to alert the user of potential data loss in the conversion, and the user may need to provide confirmation to proceed with the conversion.

FIGS. 4A-D include user experiences illustrating manual population and configuration of a newly added choice type column. A collaboration database engine of a collaboration service may be configured to detect creation and/or modification of a table 406 through an application associated with the service. The table 406 may include one or more rows 408 and columns 410 creating a plurality of cells. In response to a request to add a choice type column 412 to the table through a user selection of a graphical control 414, the collaboration database engine may automatically select, provide, and enable modification of a set of symbols 424 and associated text values 426 corresponding to choices 422 through the application, as described in detail in FIGS. 3A-D.

Figure 4A:
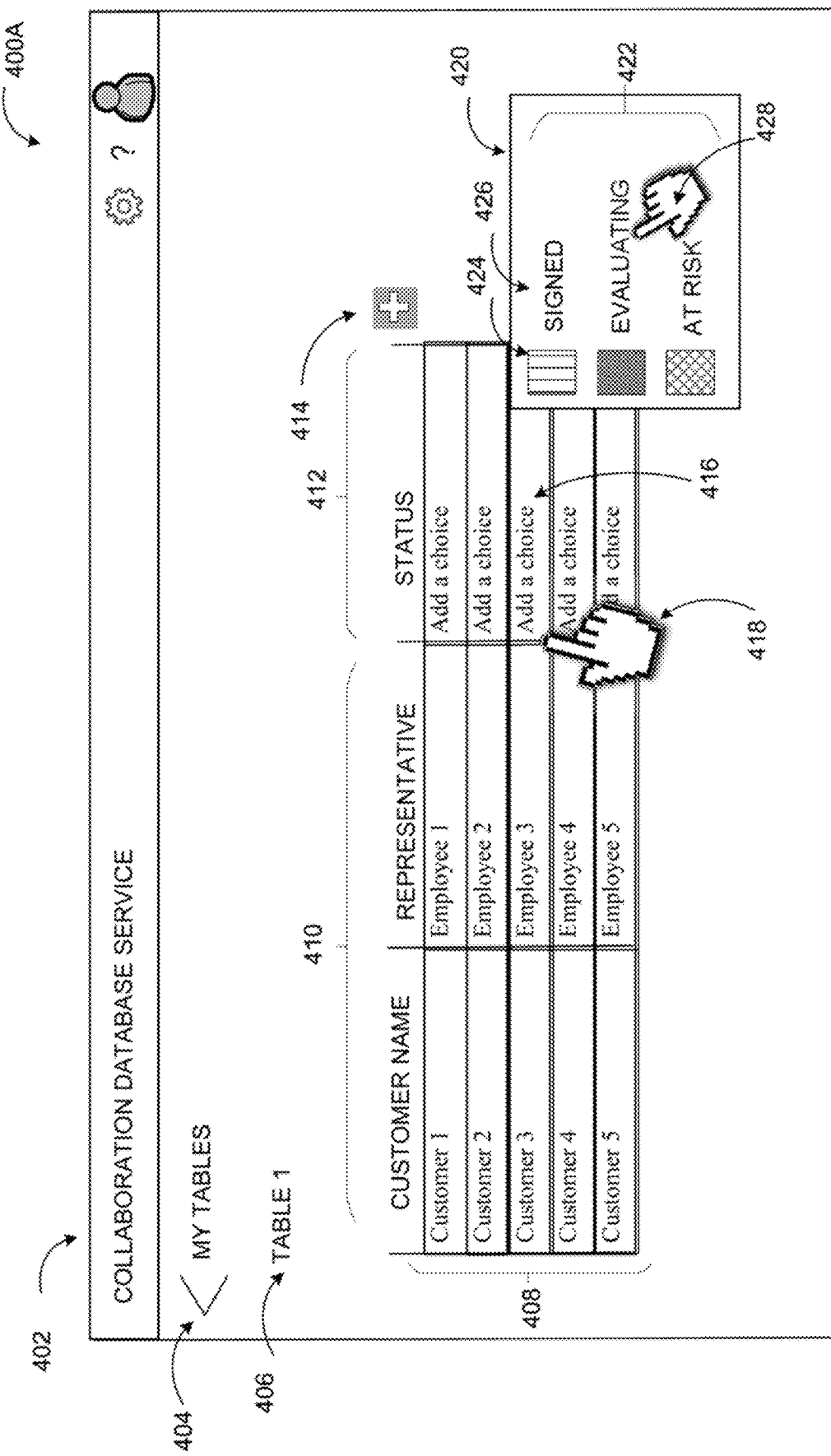
FIGS. 4A-D include user experiences illustrating manual population and configuration of a newly added choice type column.

The collaboration database engine may then be configured to provide the choice type column 412 for display within the table 406 through a "My Tables" view 404 of a user experience 402 of the application, as illustrated in diagram 400A of FIG. 4A. The choice type column 412 may be provided for display such that each cell of the choice type column 412 may be populated manually with at least one of the choices 422. For example, a default value, such as "Add a choice" may be displayed in each cell of the choice type column 412 to indicate to the user that manual population is required. In other embodiments, the choice type column 412 may be provided for display such that each cell is automatically populated with a choice (see FIGS. 7A-B for an example). In response to a first user selection 418 of a cell 416 of the choice type column 412, a menu 420 may be displayed. The menu 420 may be a drop-down menu, a pop-up menu, a radial menu, or a fly-out menu. The menu 420 may include the modified set of symbols 424 and associated text values 426 corresponding to the choices 422 for the choice type column 412.

Figure 4B:
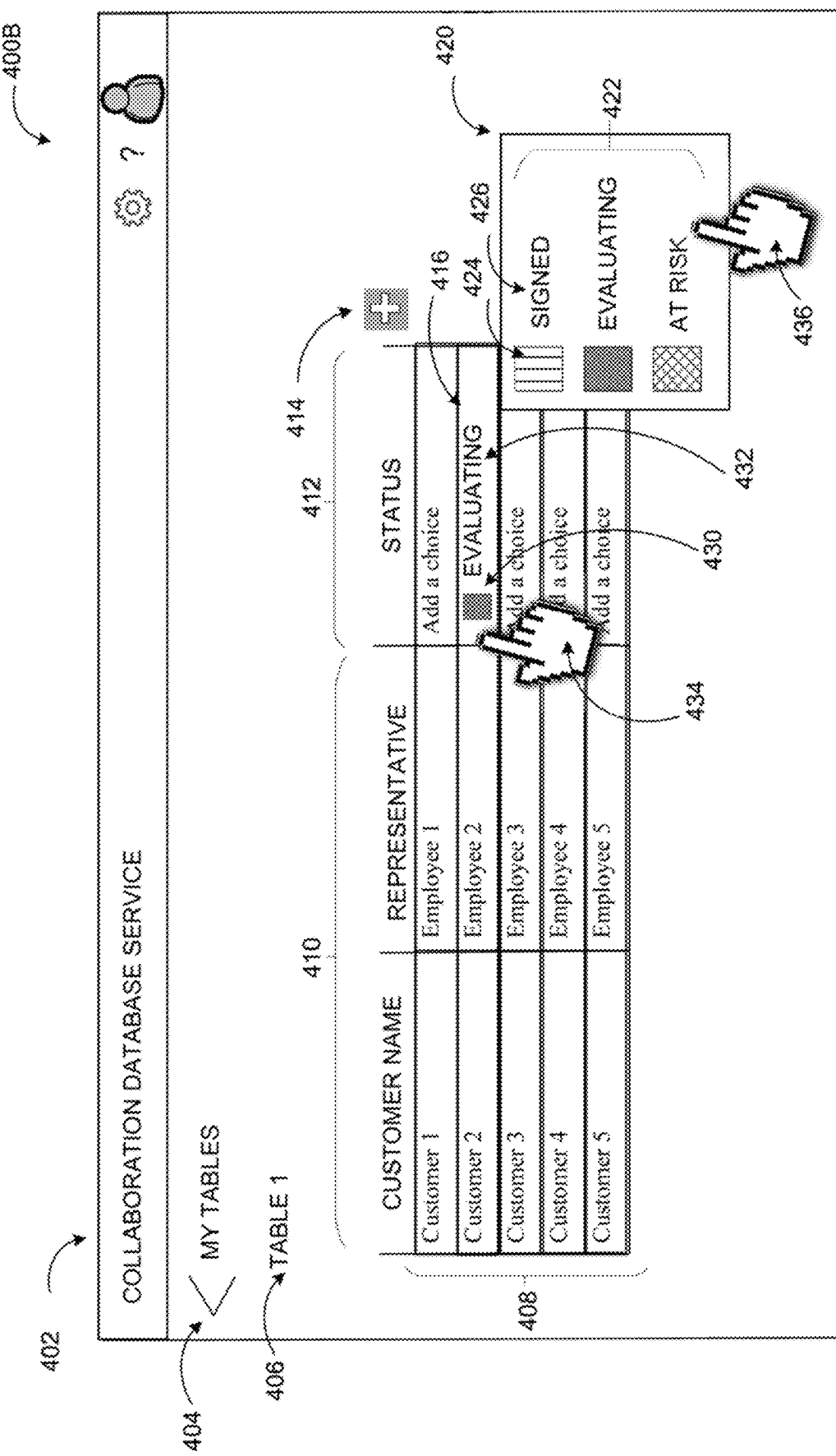
Figure 4C:
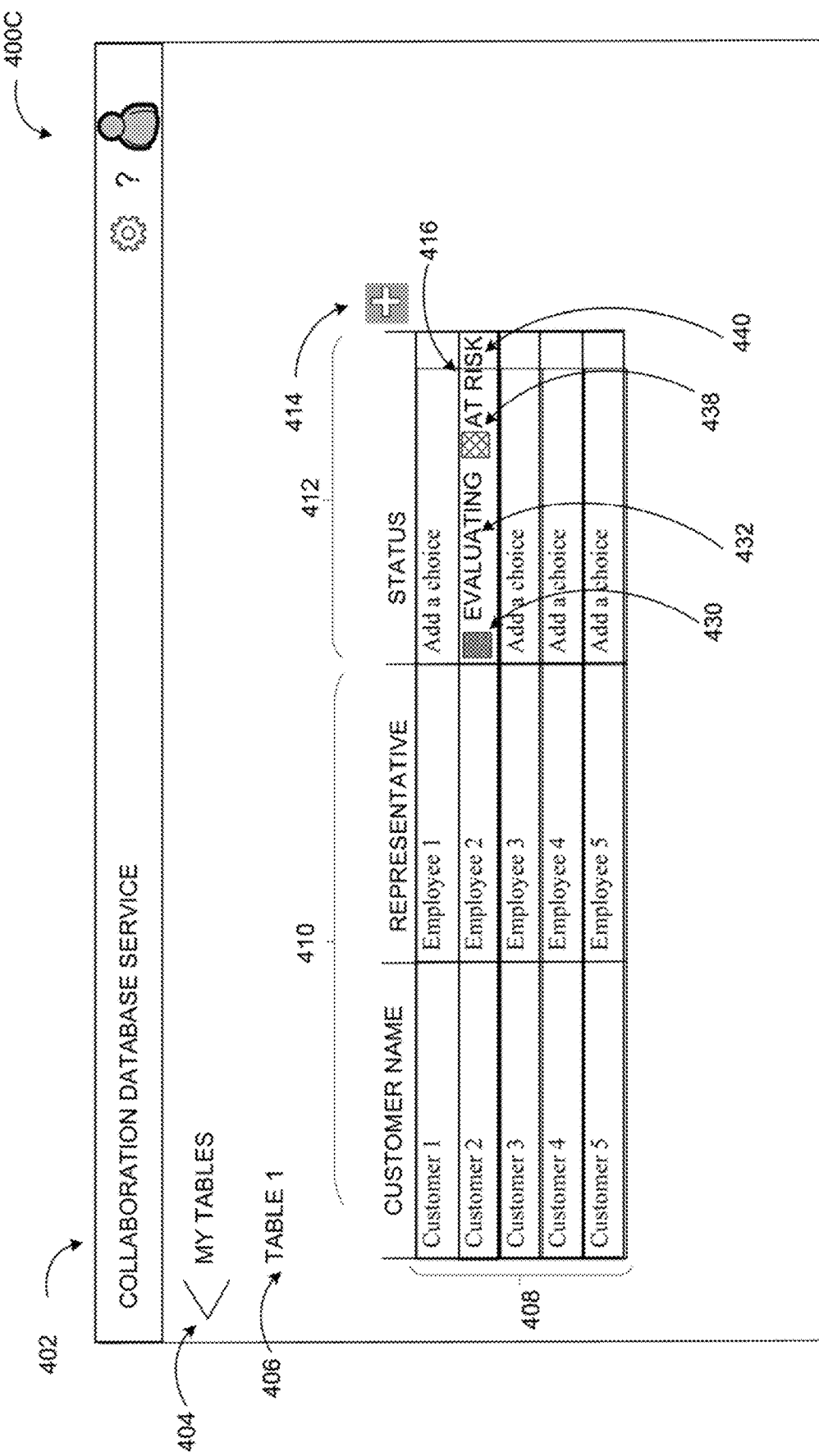

In response to a second user selection 428 of a choice from the choices 422 displayed in the menu 420, the cell 416 may be populated with a symbol 430 and associated text value 432 corresponding to the selected choice, as illustrated in diagram 400B of FIG. 4B. In some embodiments, the choice type column 412 may be configured as a multi-choice type column such that each cell of the choice type column 412 may be populated with two or more choices. If the choice type column 412 is configured as a multi-choice type column, and the user desires to populate the cell 416 with a second choice, the same process may be repeated. For example, the user may select 434 the cell 416 to display the menu 420, and then select 436 the second choice from the choices 422 displayed in the menu. In response, the cell 416 may be populated with both the symbol 430 and associated text value 432 corresponding to the first selected choice, and a symbol 438 and associated text value 440 corresponding to the second selected choice, as illustrated in diagram 400C of FIG. 4C. The processes described in FIGS. 4A-C may be repeated to populate the remaining cells of the choice type column 412.

Figure 4D:
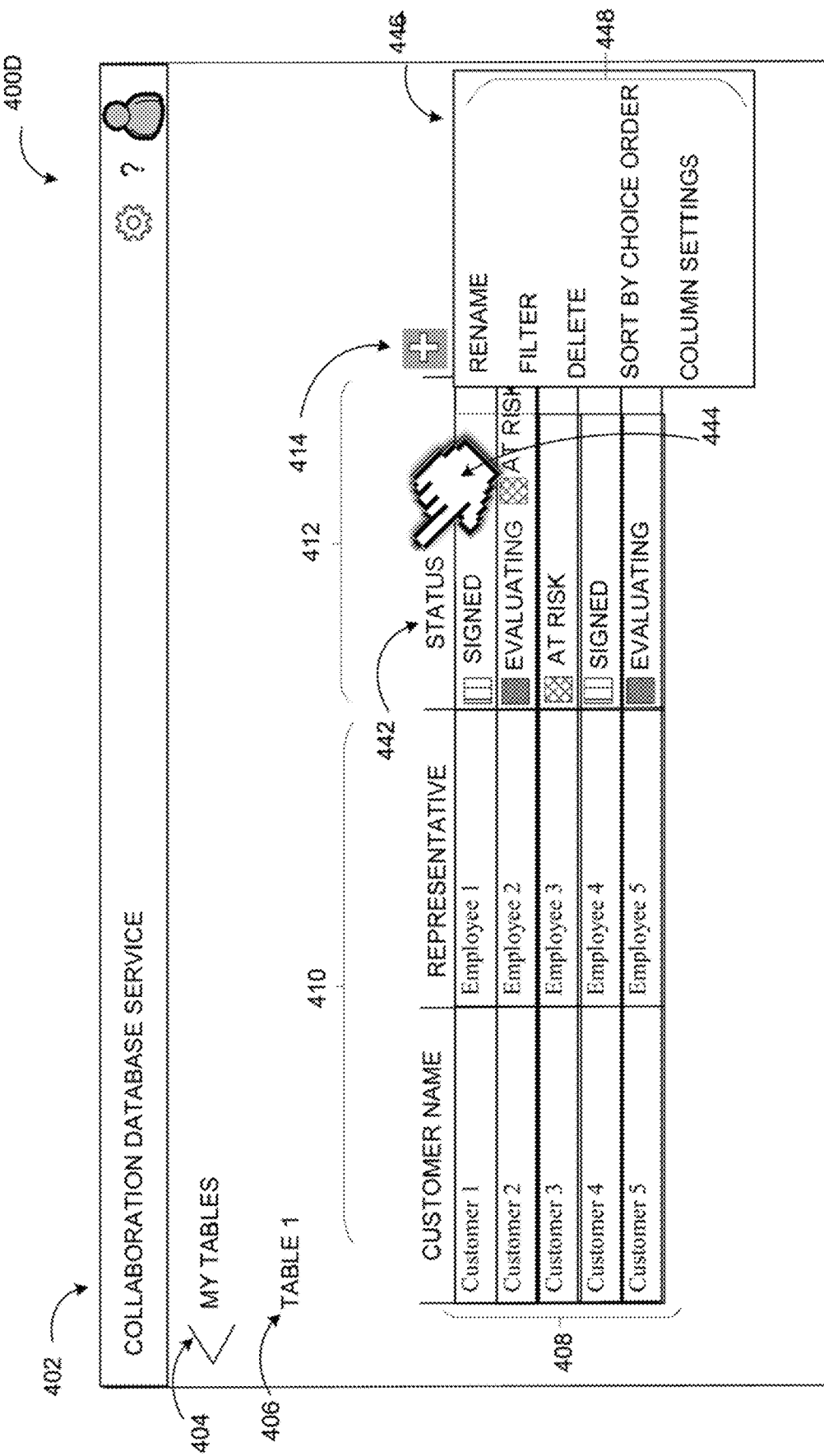

The user may also be enabled to modify the choice type column 412, as illustrated in diagram 400D of FIG. 4D. For example, a user may select 444 a label 442 of the choice type column 412. In response a menu 446 may be displayed, the menu 446 including one or more options 448 to modify the choice type column 412. The options 448 to modify the choice type column 412 may include to rename the choice type column 412 through a modification of the label 442, or to delete the choice type column 412. The options 448 may also include to filter and/or sort the choice type column 412 based on the choices populating each cell of the choice type column 412. For example, the choice type column 412 may be filtered to only display cells populated with a particular choice. For further example, the choice type column 412 may be reordered such that cells populated with a particular choice are presented higher up in the table due to urgency or importance. Additionally, the options 448 may include to edit column settings, which upon selection may return the user to a user experience similar to FIG. 3B enabling more in depth modification of the choice type column 412.

After any modifications are made to the choices populating each cell of the choice type column 412 and/or the choice type column 412 itself, the updated table 406 may be stored locally at local storage of the device on which the application is being executed and/or remotely at the data stores managed by the storage servers of the collaboration database service, or by third party storage services, for example. In some embodiments, the updated table 406 may be sent to other users who are collaborating with the user on the table 406.

Figure 5:
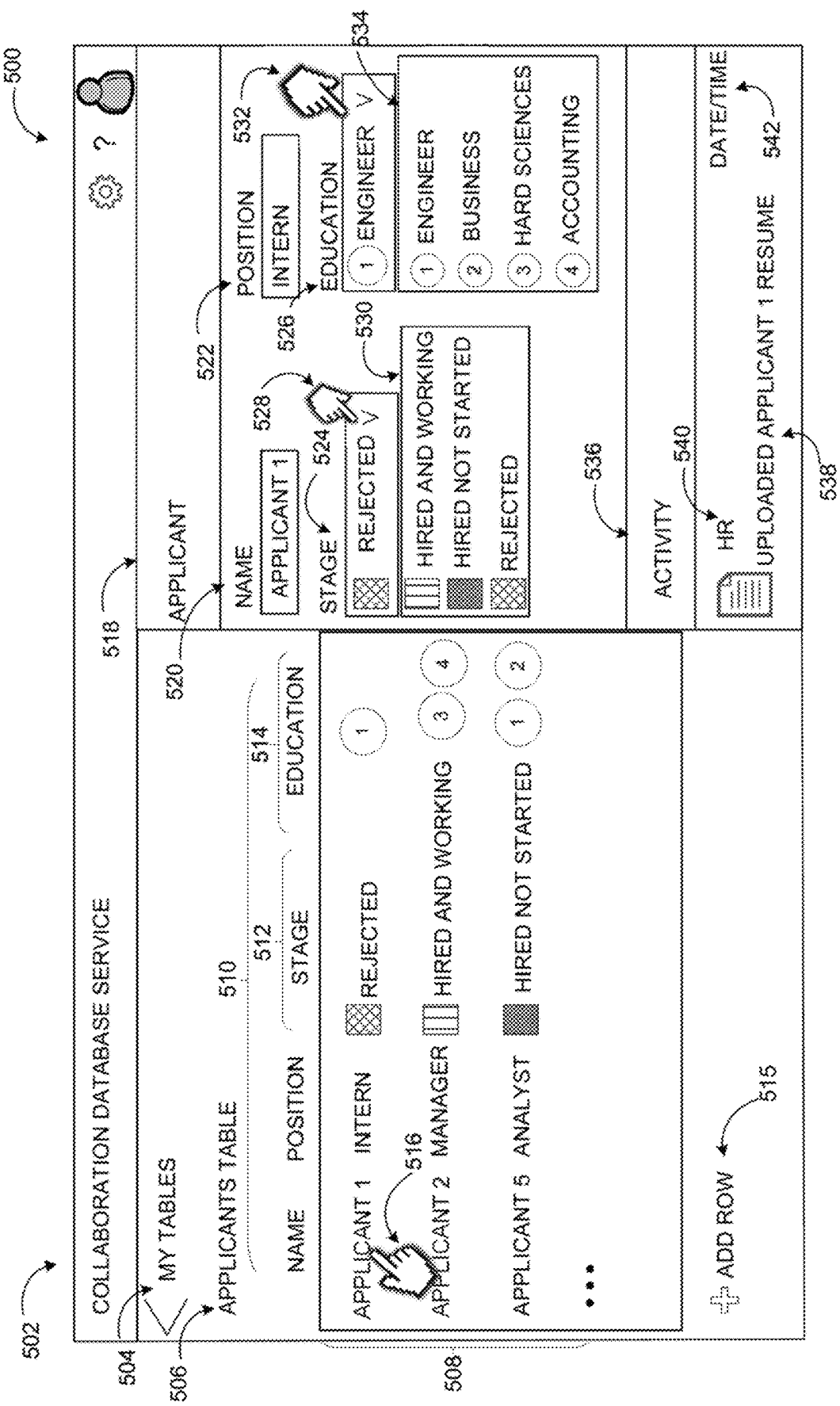
FIG. 5 includes an example user experience for editing cells within a table comprising one or more choice type columns.

FIG. 5 includes an example user experience for editing cells within a table comprising one or more choice type columns. As previously discussed, a collaboration database service may be provided to enable creation and collaboration of content on custom databases, where the collaboration database service may include a collaboration database engine. The content may be displayed through an application associated with the collaboration database service that is executed on a user device to enable interactivity with the content. The user device may have one or more input device(s) such that the user may interact with the content through a keyboard input, a mouse input, a pen input, a touch, an optically captured gesture, a voice input, a gyroscopic input, and/or an eye-tracking input, for example.

As shown in diagram 500, a collaboration database service may provide a user experience 502 through the application to enable a user to create and/or modify a table 506 through a "My Tables" view 504. In an example scenario, the table 506 may represent data associated with applicants who are undergoing a job application process with a company. The table 506 may include one or more rows 508 and columns 510 comprising a plurality of cells, where the rows 508 and columns 510 may be configured as entities of the table 506. The rows 508 may represent data associated with a particular applicant undergoing the job application process. The columns 510 may include a name column, a position column, a stage column 512, and an education column 514. The stage column 512 and the education column 514 may be choice type columns, where the choices for each of the stage column 512 and the education column 514 may be sub-entities of the table 506 contained within each respective column. The stage column 512 may be configured as a single choice type column such that no more than one choice may populate each cell of the stage column 512. The choices, each represented by a symbol and associated text value, may include "hired and working", "hired and not started", and "rejected", for example. The education column 514 may be configured as a multi-choice type column such that two or more choices may populate each cell of the education column 514. The choices, each represented by a symbol may include engineer, business, hard, sciences, and accounting, among other examples. A graphical control 515 may also be displayed to allow the user to modify the table 506 to include additional applicants as they enter the job application process.

In response to a user selection 516 of an applicant from the table 506 (where the user may select any cell within the row representing the applicant), an "Applicant" view 518 may be displayed through the user experience 502. The "Applicant" view 518 may automatically display data from cells of the table 506 that correspond to the applicant selected. For example, data from the table 506, such as an applicant name 520, position 522, stage 524, and education 526 (corresponding to each of the columns 510) may be displayed. The user may be enabled to edit the data through the "Applicant" view 518. For example, the user may edit data associated with the applicant name 520 or position 522 by entering different text values. As previously discussed, the stage column 512 and the education column 514 may be choice type columns, where the choices may be represented by a set of symbols and/or associated text values corresponding to each choice. Therefore, the user may edit the data associated with the stage 524 and/or education 526 of the applicant by selecting 528, 532 drop-down menus 530, 534 that display the set of symbols and/or associated text values corresponding to each choice. The "Applicant" view 518 may track which users make edits, what types of edits are made, and when the edits are made for optional display. Any edits made through the "Applicant" view 518 may cause the cells of the table 506 to be automatically updated with the new data values. For example, if the user edits the stage 524 of an applicant from "hired and not started" to "hired and working" through the drown-down menu 530 of the "Applicant" view 518, the cell of the stage column 512 corresponding to that applicant will be updated within the table 506 to include the symbol and associated text value corresponding to the edited choice.

The "Applicant" view 518 may also include an activity history 536 associated with that applicant. For example, the activity history 536 may indicate a document 538, such as a resume of the applicant was uploaded, where a link to the document may be included. The user or group 540 who uploaded the document and a date and time 542 the document was uploaded may also be indicated. The activity history 536 may further enable other users collaborating with the user to post comments and/or messages. For example, a member of the hiring committee may be able to post comments about their interview with the applicant through the activity history 536 for display to all other members.

FIGS. 6A-D include example user experiences displayed by a mobile device illustrating an addition of a choice type column and modification of a selected set of symbols and associated text values corresponding to choices contained within the choice type column. A collaboration database service comprising a collaboration database engine may be provided to enable creation and collaboration of content on custom databases. The content may be displayed through an application associated with the collaboration database service that is executed on a user device, such as a mobile device 602 as shown in diagrams 600A-D, to enable interactivity with the content. The mobile device 602 may have one or more input device(s) such that the user may interact with the content through a pen input, a touch, an optically captured gesture, a voice input, a gyroscopic input, and/or an eye-tracking input, for example.

Figure 6A:
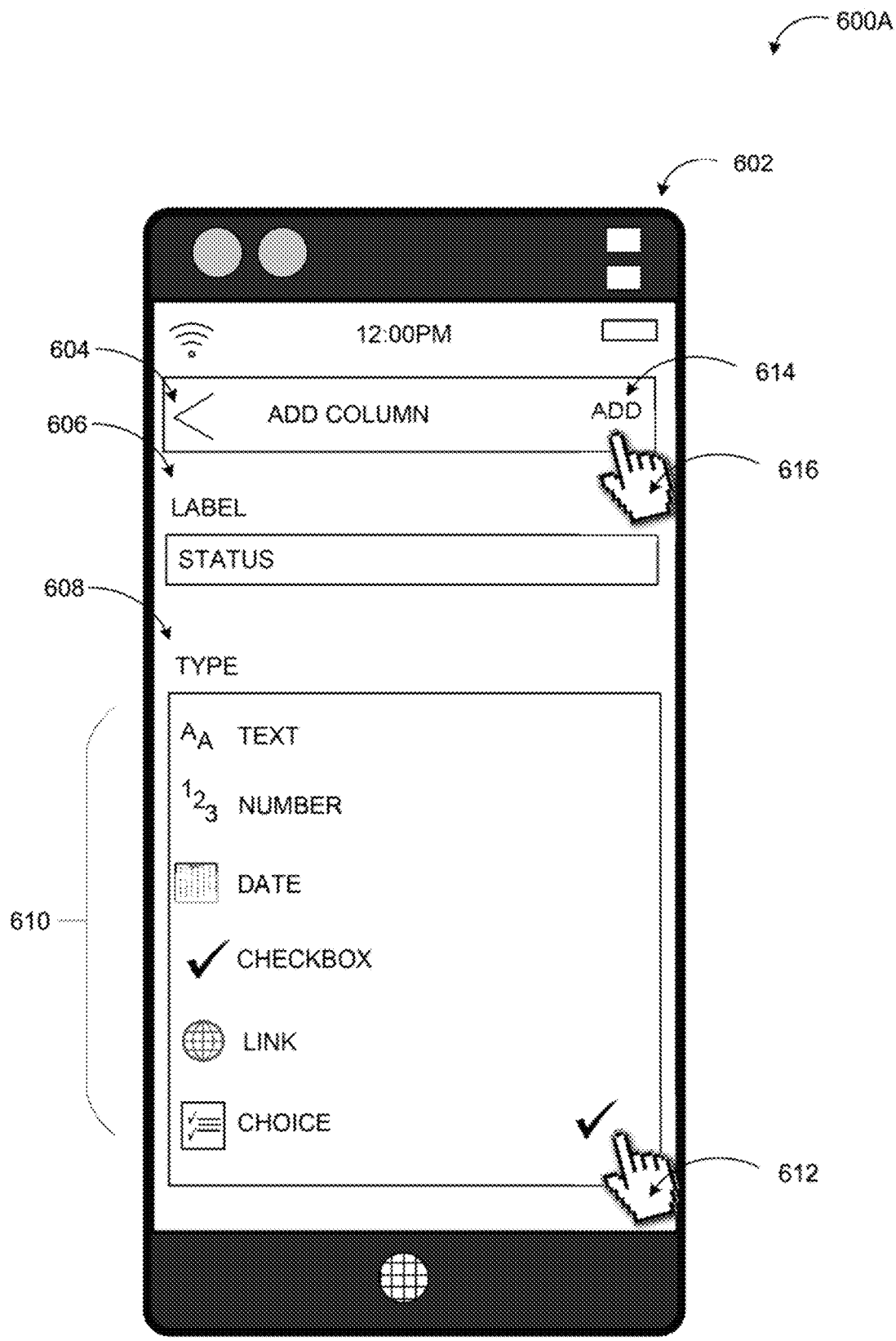
FIGS. 6A-D include example user experiences displayed by a mobile device illustrating an addition of a choice type column and modification of a selected set of symbols and associated text values corresponding to choices contained within the choice type column.
Figure 6B:
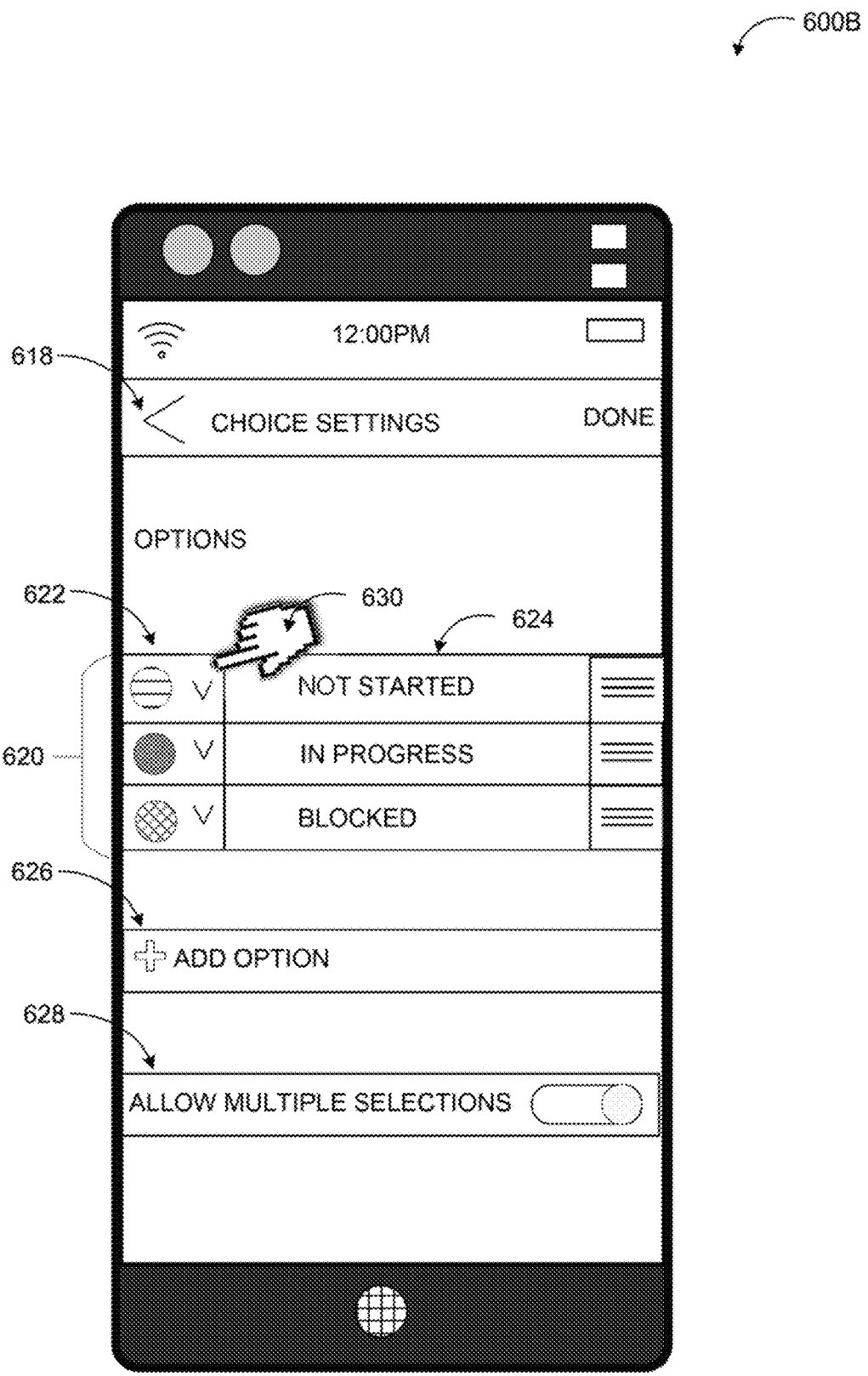
Figure 6C:
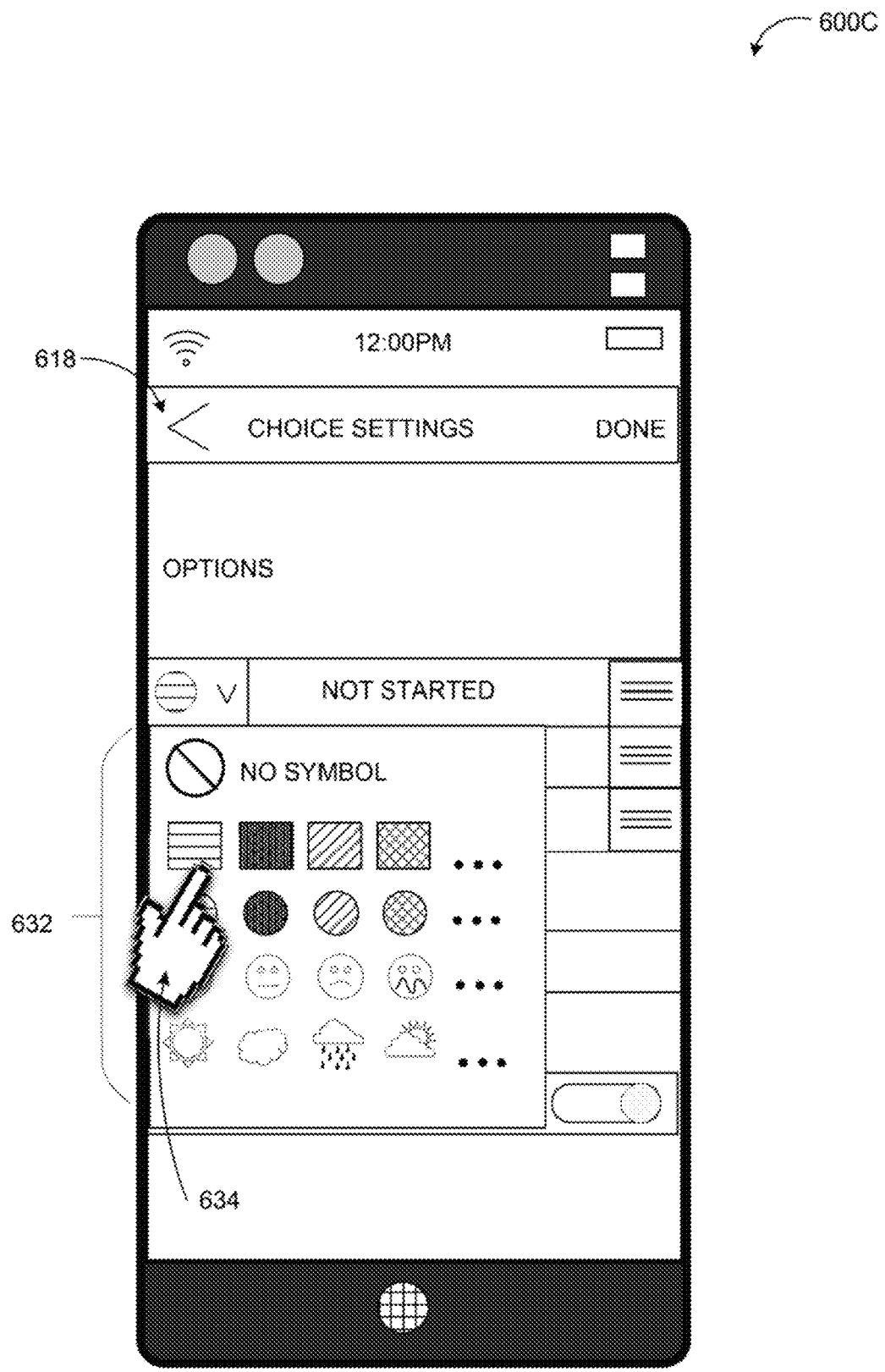
Figure 6D:
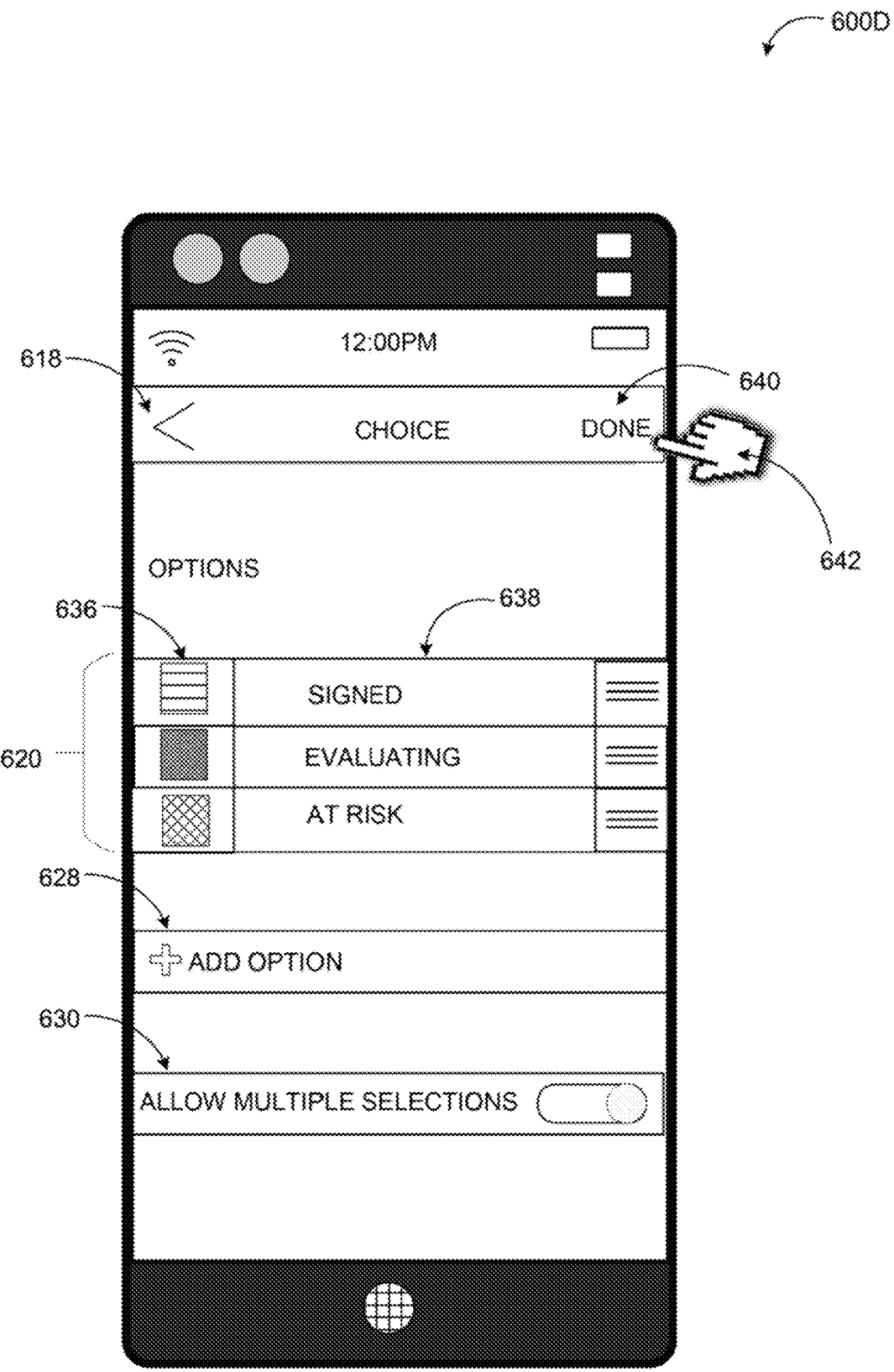

As shown in diagram 600A of FIG. 6A, in response to a user request to add a column to a newly created and/or existing table, the collaboration database service may provide a "add column" view 604 for display through a user experience of the application. The "add column" view 604 may display a label 606 for the column, which may be entered and/or modified by the user. For example, the user may enter "Status" as the label 606. The "add column" view 604 may also display several options 610 for a type 608 of column to be added, such as text, number, date, checkbox, link and choice type columns, among other options. Selection of the choice option may enable a choice type column to be added to the table, for example. In response to a first user selection 612 of a choice type column for the type 608 of column to be added, and a second user selection 616 of an "add" control element 614, a "Choice Settings" view 618 may be displayed, as shown in diagram 600B of FIG. 6B.

The "Choice Settings" view 618 may automatically display choices 620 configured as sub-entities of the choice type column. The choice type column may be a single choice type column or a multi-choice type column. If configured as a single choice type column, an allowable number of the choices 620 to populate a cell of the column is zero (e.g., a "none" choice) or one such that no more than one choice populates the cell. If configured as a multi-choice type column, an allowable number of the choices 620 to populate a cell of the column is zero, one, or more choices such that two or more choices may populate the cell simultaneously. The collaboration database engine may be configured to automatically select a set of symbols 622 and associated text values 624 corresponding to the choices 620 to provide for display. The set of symbols 622 and associated text values 624 may be provided for display as default values which may be modified by the user. For example, a different symbol and/or different associated text value corresponding to a choice may be selected, or one of a symbol or an associated text value corresponding to a choice may be disabled. Additionally, a choice may be deleted through disablement of both a symbol and associated text value of the choice, and a new choice may be added through actuation of an "add option" control element 626 and selection of a new symbol and new associated text value corresponding to the new choice. The "Choice Settings" view 618 may also provide an "allow multiple selections" control element 628 to enable a user to convert the choice type column from a single choice type column to a multi-choice type column or from a single choice type column to a multi-choice type column. The control elements 626 and 628 may be buttons, toggles, or other similar graphical control elements, for example.

In response to a user selection 630 to modify a symbol from the set of symbols 622, a menu 632 may be displayed through the "Choice Settings" view 618, as shown in diagram 300C of FIG. 3C. The menu 632 may be a drop-down menu, a pop-up menu, a radial menu, or a fly-out menu, for example. The menu 632 may include a variety of symbols for user selection 634, as well as an option to select no symbol. The symbols may be glyphs and/or emojis of varying shapes, sizes, colors, patterns, and types, as illustrated. In some embodiments, the symbols may be animated. In addition to modifying one or more symbols, the user may also modify associated text values from the set of symbols 622 and associated text values 624 to produce a modified set of symbols 636 and associated text values 638, as shown in diagram 300D of FIG. 3D. Once the user has completed his or her modifications, the user may select 642 the "done" control element 640 of the "Choice Settings" view 618.

Figure 7A:
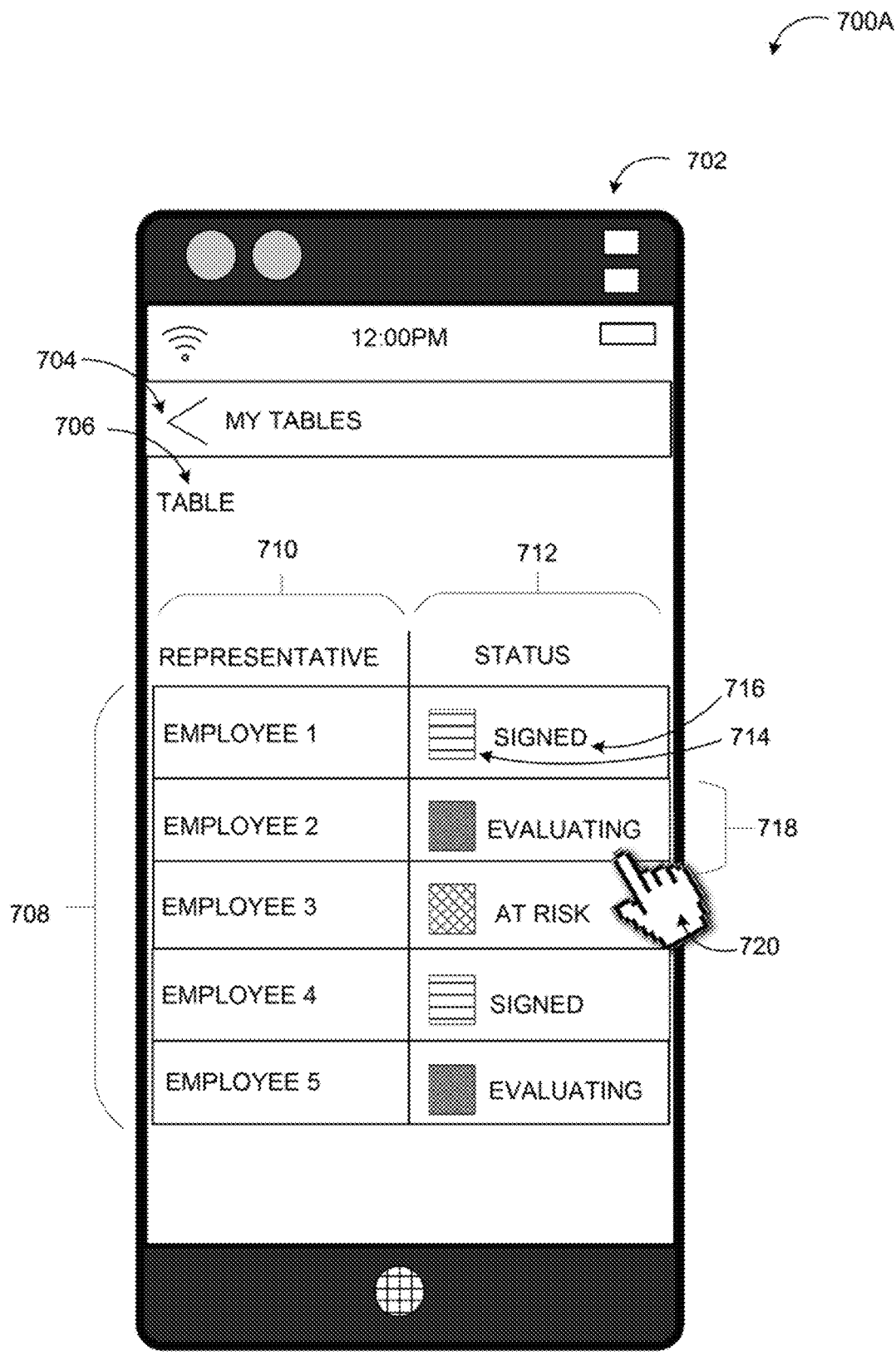
FIGS. 7A-B include example user experiences displayed by a mobile device illustrating modification of an automatically populated choice type column.
Figure 7B:
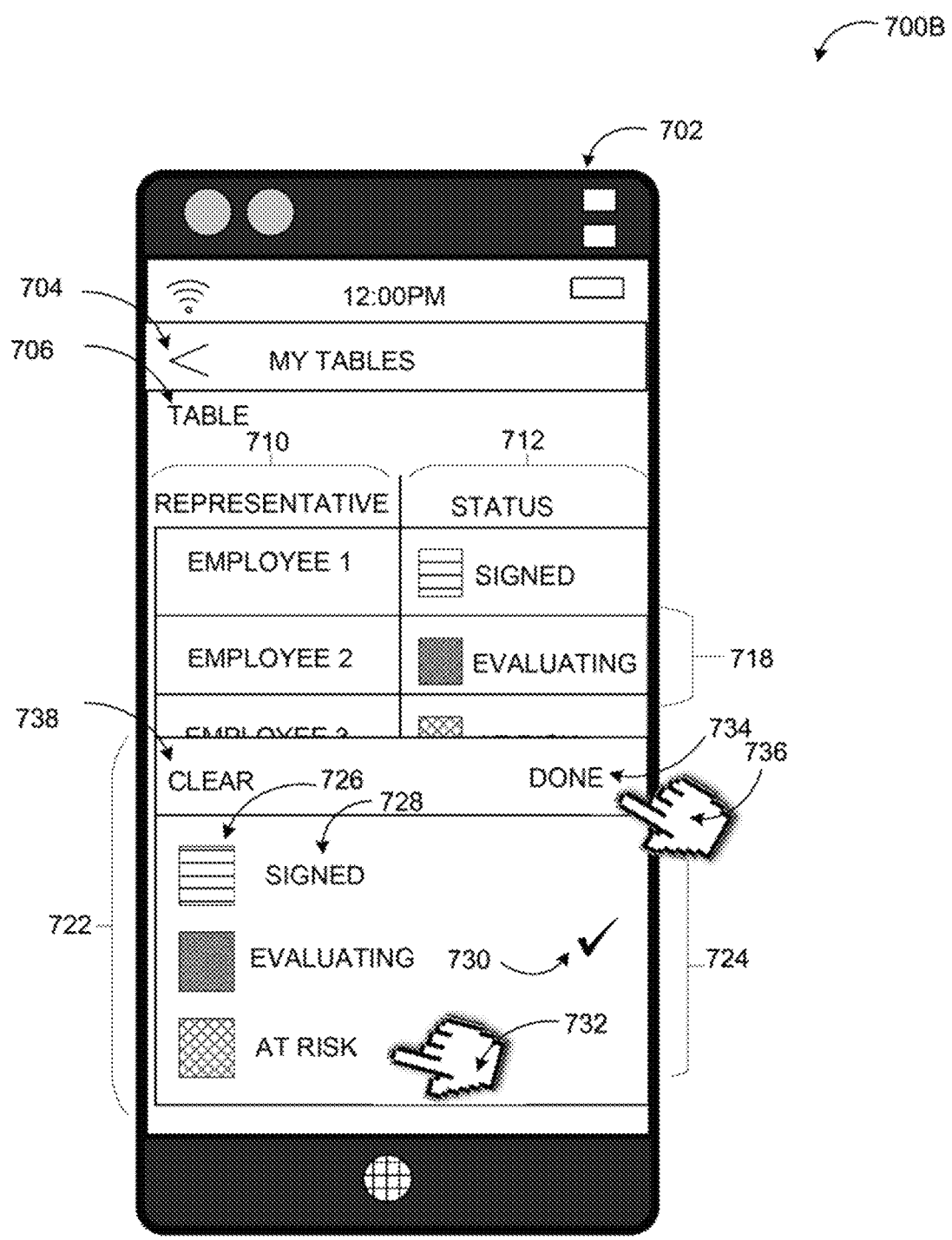

FIGS. 7A-B include example user experiences displayed by a mobile device illustrating modification of an automatically populated choice type column. A collaboration database engine of a collaboration service may be configured to detect creation and/or modification of a table 706 through an application associated with the service, where the application may be executed on a user device, such as a mobile device 702 as shown in diagrams 700A-D. The table 706 may include one or more rows 708 and columns 710 creating a plurality of cells. In response to a request to add a choice type column 712 to the table, the collaboration database engine may automatically select, provide, and enable modification of a set of symbols and associated text values corresponding to choices through the application, as described in detail in FIGS. 6A-D.

The collaboration database engine may then be configured to provide the choice type column 712 for display within the table 706 through a "My Tables" view 704 of a user experience of the application, as illustrated in diagram 700A of FIG. 7A. The choice type column 712 may be provided for display such that each cell of the choice type column 412 is automatically populated with at least one of the choices, where each choice is represented by a symbol 714 and an associated text value 716 from the modified set of symbols and associated text values that corresponds to each respective choice. The collaboration database engine may be configured to retrieve data associated with the choices from one or more other services associated with the collaboration database service in order to populate each cell of the choice type column 712. The services may include another database service, a Global Positioning Service (GPS), a scheduling service, and a presence service, among other services. Returning to an example scenario previously presented, the table 706 may represent sales contract data associated with a company whose employees are each a representative for a potential customer of the company. The choice type column 712 may be added to indicate a status of a sales contract with the potential customers of the company. Thus, the choices may be represented by a modified set of symbols and associated text values of "signed", "evaluating" or "at risk." The company may store information, including a status of the sales contract, associated with each potential customer in separate files of a database and/or in separate databases hosted by another database service, for example. Therefore, the collaboration database engine may be configured to retrieve the status data for each potential customer from the other database service storing the information in order to populate each cell of the choice type column 712. In other embodiments, the choice type column 712 may be provided for display such that each cell is manually populated with a choice (see FIGS. 4A-D for an example).

In some examples, the choices populating each cell of the choice type column 712 may be aggregated to determine a percentage of each of the choices within the choice type column 712 to provide a more holistic view of the data represented by the table 706. For example, each cell of the choice type column 712 may be populated with one of the "signed", "evaluating" or "at risk" choices, and the collaboration database engine may be configured to aggregate the choices contained within the cells to determine an overall status of sales contracts with potential customers. For example, the overall status may indicate a percentage of each choice to enable a user to grasp how many potential customers have been signed versus how many are being evaluated and/or are at risk.

In response to a user selection 720 of a cell 718 of the choice type column 712, a menu 722 may be displayed, as illustrated in diagram 700B of FIG. 7B. The menu 722 may be a drop-down menu, a pop-up menu, a radial menu, or a fly-out menu. Additionally, the menu 722 may be a full-screen menu such that the menu 722 occupies an entire display of the mobile device 702. The menu 722 may include a modified set of symbols 726 and associated text values 728 corresponding to choices 724 for the choice type column 712. The menu 722 may be displayed to enable the user to select an additional choice to populate the cell 718, for example. The choice type column 712 may need to be configured as a multi-choice type column to enable population of each cell with more than one choice. In some embodiments, the choice type column 712 may be automatically configured as a multi-choice type column as a default. However, if the choice type column 712 is configured as a single choice type column, the choice type column 712 may be converted to a multi-choice type column to enable a user to populate a cell with more than one choice (see FIG. 6A-B for an example).

The user may select 732 an additional choice from the choices 724 displayed in the menu 722, where the additional choice is different from the choice the cell 718 was automatically populated with. The user may then select 736 the "done" control element 734 of the menu 722. In response, the cell 718 may be populated with the symbol and associated text value corresponding the choice the cell 718 was automatically populated with, along with a symbol and associated text value corresponding to the additional choice. Alternatively, the user may select the "clear" control element 738 of the menu 722, if the user no longer wishes to populate the cell 718 with the additional choice. The updated table 706 may be stored locally at local storage of the mobile device 702 and/or remotely at the data stores managed by the storage servers of the collaboration database service, or by third party storage services, for example. In other embodiments, the menu 722 may be displayed to enable the user to edit the choice populating the cell 718.

The examples provided in FIGS. 1 through 7A-B are illustrated with specific systems, services, applications, engines, and user experience configurations. Embodiments are not limited to environments according to these examples. Presentation of single and/or multi-choice data through a collaboration service may be implemented in environments employing fewer or additional systems, services, applications, engines, and user experience configurations. Furthermore, the example systems, services, applications, engines, and user experience configurations shown in FIG. 1 through 7A-B may be implemented in a similar manner with other values using the principles described herein.

Figure 8:
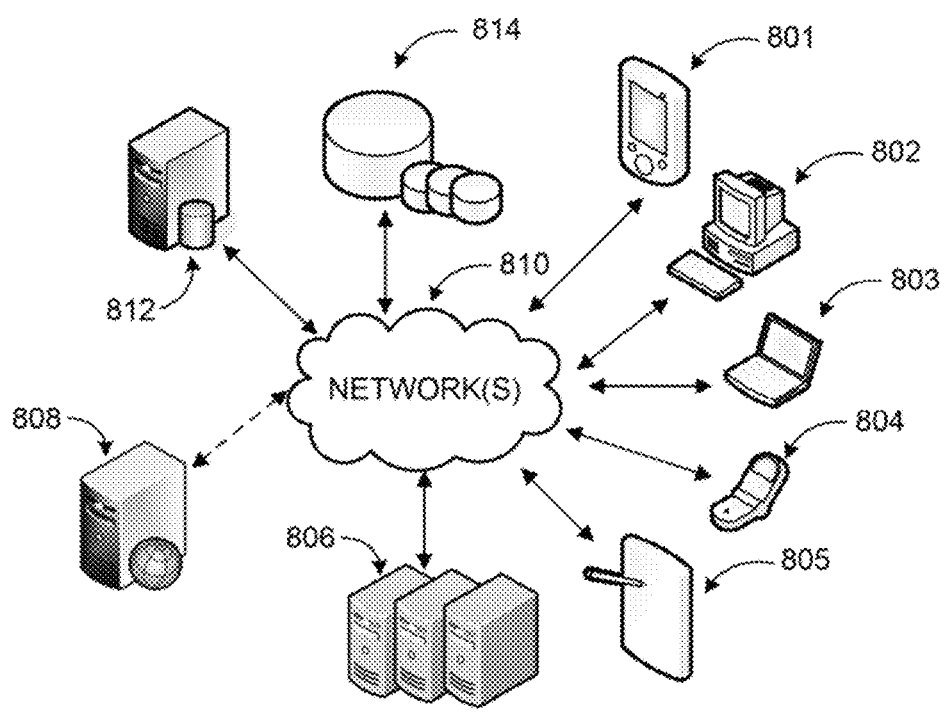
FIG. 8 is a networked environment, where a system according to embodiments may be implemented.

FIG. 8 is a networked environment, where a system according to embodiments may be implemented. In addition to locally installed applications (for example, application 106), a collaboration database engine may also be employed in conjunction with hosted applications and services (for example, a productivity or collaboration database application and/or a collaboration database service) that may be implemented via software executed over one or more servers 806 or individual server 808, as illustrated in diagram 800. A hosted service or application may communicate with client applications on individual computing devices such as a handheld computer 801, a desktop computer 802, a laptop computer 803, a smart phone 804, a tablet computer (or slate), 805 ('client devices') through network(s) 810 and control a user interface presented to users.

Client devices 801-805 are used to access the functionality provided by the hosted service or application. One or more of the servers 806 or server 808 may be used to provide a variety of services as discussed above. Relevant data may be stored in one or more data stores (e.g. data store 814), which may be managed by any one of the servers 806 or by database server 812.

Network(s) 810 may comprise any topology of servers, clients, Internet service providers, and communication media. A system according to embodiments may have a static or dynamic topology. Network(s) 810 may include a secure network such as an enterprise network, an unsecure network such as a wireless open network, or the Internet. Network(s) 810 may also coordinate communication over other networks such as PSTN or cellular networks. Network(s) 810 provides communication between the nodes described herein. By way of example, and not limitation, network(s) 810 may include wireless media such as acoustic, RF, infrared and other wireless media.

Many other configurations of computing devices, applications, engines, data sources, and data distribution systems may be employed for single and/or multi-choice data presentation through a collaboration database service. Furthermore, the networked environments discussed in FIG. 8 are for illustration purposes only. Embodiments are not limited to the example applications, engines, or processes.

Figure 9:
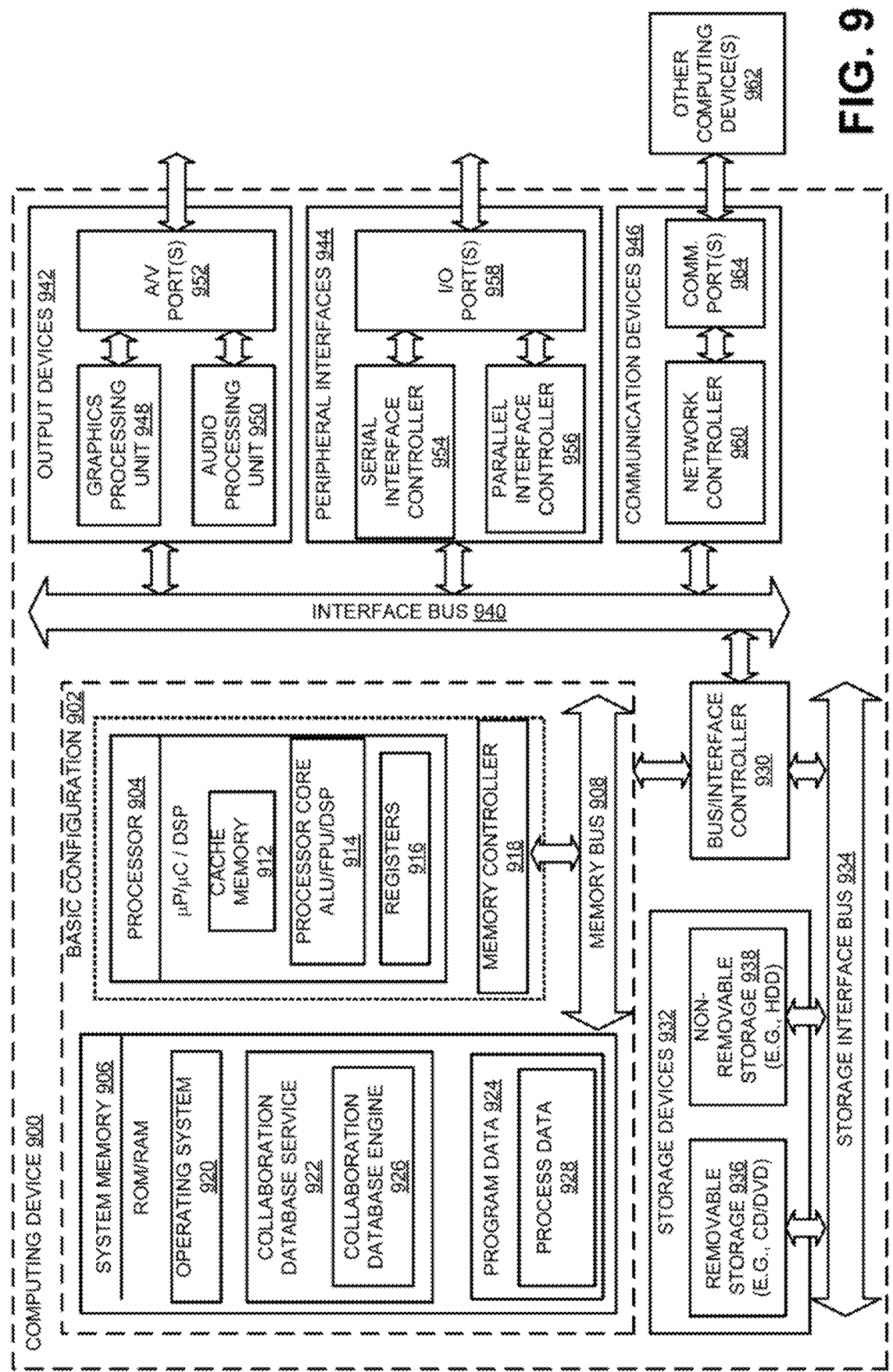
FIG. 9 is a block diagram of an example general purpose computing device, which may be used for single and/or multi-choice data presentation through a collaboration database service.

FIG. 9 is a block diagram of an example general purpose computing device, which may be used for single and/or multi-choice data presentation through a collaboration database service.

For example, computing device 900 may be used as a server, desktop computer, portable computer, smart phone, special purpose computer, or similar device. In an example basic configuration 902, the computing device 900 may include one or more processors 904 and a system memory 906. A memory bus 908 may be used for communicating between the processor 904 and the system memory 906. The basic configuration 902 is illustrated in FIG. 9 by those components within the inner dashed line.

Depending on the desired configuration, the processor 904 may be of any type, including but not limited to a microprocessor (µP), a microcontroller (µC), a digital signal processor (DSP), or any combination thereof. The processor 904 may include one more levels of caching, such as a level cache memory 912, one or more processor cores 914, and registers 916. The example processor cores 914 may (each) include an arithmetic logic unit (ALU), a floating point unit (FPU), a digital signal processing core (DSP Core), or any combination thereof. An example memory controller 918 may also be used with the processor 904, or in some implementations the memory controller 918 may be an internal part of the processor 904.

Depending on the desired configuration, the system memory 906 may be of any type including but not limited to volatile memory (such as RAM), non-volatile memory (such as ROM, flash memory, etc.) or any combination thereof. The system memory 906 may include an operating system 920, a collaboration database service 922, and program data 924. The collaboration database service 922 may include a collaboration database engine 926, which may be an integrated module of the collaboration database service 922. The collaboration database engine 926 may be configured to detect creation or modification of a table through an application associated with the collaboration database service 922, where the table may be comprised of columns and rows that may be entities of the table. In response to a request to add a choice type column to the table, the collaboration database engine 926 may be configured to automatically select, provide, and enable modification of a set of symbols and associated text values corresponding to choices through the application, where the choices may be sub-entities of the table contained within choice type column. The collaboration database engine 926 may then provide the choice type column for display within the table such that each cell of the choice type column is populated with at least one of the choices, where the choice(s) may be represented by a symbol and/or associated text value from the modified set of symbols and associated text values that correspond to the choice(s). The program data 924 may include, among other data, process data 928, such as the content contained within entities and sub-entities of the table, as described herein.

The computing device 900 may have additional features or functionality, and additional interfaces to facilitate communications between the basic configuration 902 and any desired devices and interfaces. For example, a bus/interface controller 930 may be used to facilitate communications between the basic configuration 902 and one or more data storage devices 932 via a storage interface bus 934. The data storage devices 932 may be one or more removable storage devices 936, one or more non-removable storage devices 938, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 906, the removable storage devices 936 and the non-removable storage devices 938 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 900. Any such computer storage media may be part of the computing device 900.

The computing device 900 may also include an interface bus 940 for facilitating communication from various interface devices (for example, one or more output devices 942, one or more peripheral interfaces 944, and one or more communication devices 946) to the basic configuration 902 via the bus/interface controller 930. Some of the example output devices 942 include a graphics processing unit 948 and an audio processing unit 950, which may be configured to communicate to various external devices such as a display or speakers via one or more A/V ports 952. One or more example peripheral interfaces 944 may include a serial interface controller 954 or a parallel interface controller 956, which may be configured to communicate with external devices such as input devices (for example, keyboard, mouse, pen, voice input device, touch input device, etc.) or other peripheral devices (for example, printer, scanner, etc.) via one or more I/O ports 958. An example communication device 946 includes a network controller 960, which may be arranged to facilitate communications with one or more other computing devices 962 over a network communication link via one or more communication ports 964. The one or more other computing devices 962 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 900 may be implemented as a part of a general purpose or specialized server, mainframe, or similar computer that includes any of the above functions. The computing device 900 may also be implemented as a personal computer including both laptop computer and non-laptop computer configurations.

Example embodiments may also include methods for single and/or multi-choice data presentation through a collaboration database service. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 10:
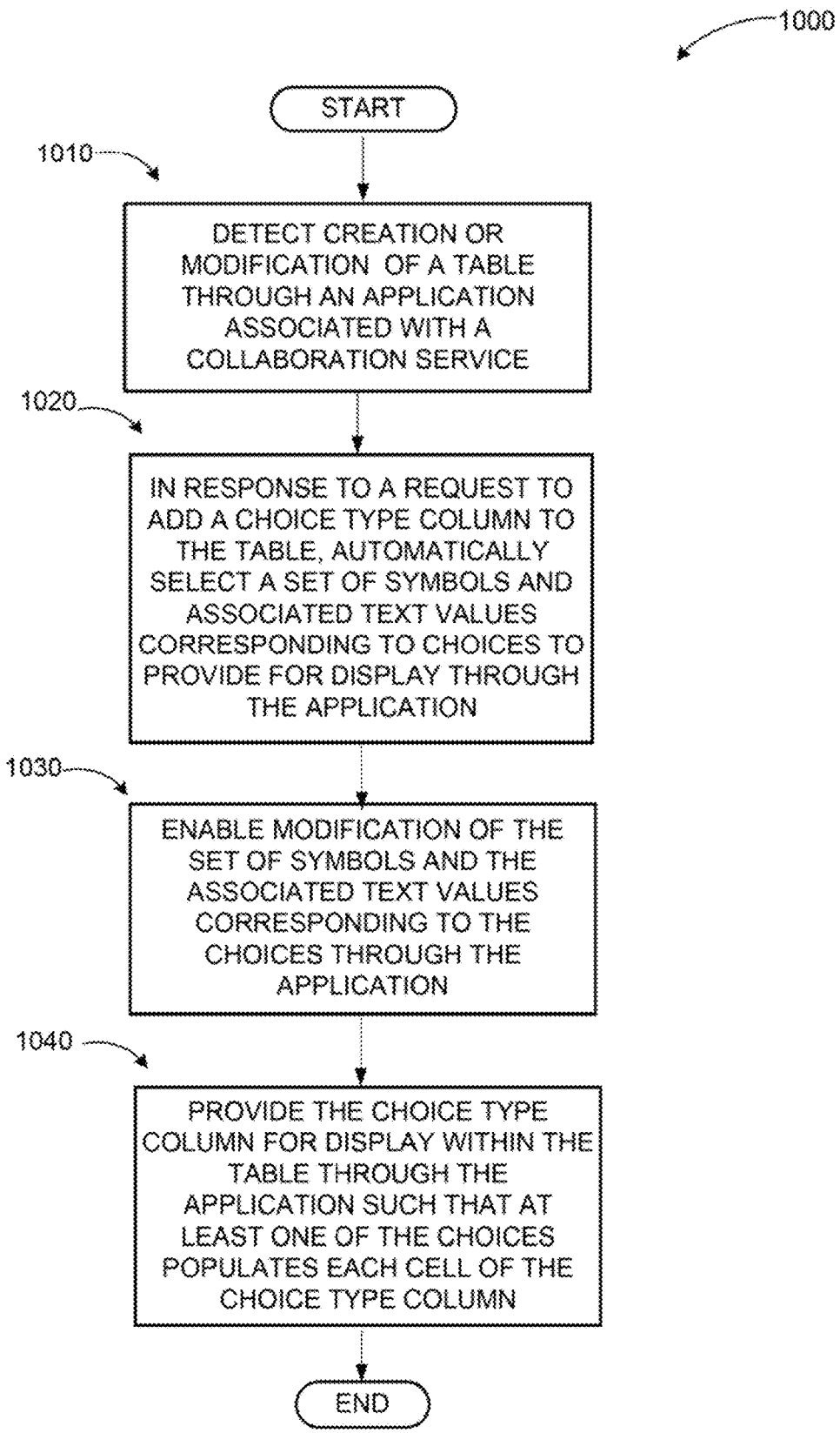
FIG. 10 illustrates a logic flow diagram of a method for single and/or multi-choice data presentation through a collaboration database service, according to embodiments.

FIG. 10 illustrates a logic flow diagram of a method for single and/or multi-choice data presentation through a collaboration database service, according to embodiments.

Process 1000 may be implemented on a computing device, server, or other system. An example system may include a server configured to execute a collaboration database service provided to enable creation and collaboration of content on custom databases. The server may include, among other components, one or more processors configured to execute a collaboration database engine of the collaboration database service. The collaboration database service may also integrate and/or interoperate with a productivity application that is being executed on a device associated with a customer such that the customer may create collaborative content through the productivity application that may be shared and edited through the collaboration database service.

Process 1000 begins with operation 1010, where the collaboration database engine may be configured to detect creation or modification of a table through an application, where the application may be a collaboration database application or the productivity application, for example. The table may comprise one or more columns and rows creating a plurality of cells, where the columns and rows may be entities of the table. At operation 1020, in response to a request to add a choice type column to the table, the collaboration database engine may be configured to automatically select a set of symbols and associated text values corresponding to choices to provide for display through the productivity application. The choice type column may be configured as a single choice type column or a multi-choice type column. If configured as a single choice type column, an allowable number of choices to populate a cell of the column is zero (e.g., a "none" choice) or one such that no more than one choice populates the cell. If configured as a multi-choice type column, an allowable number of choices to populate a cell of the column is zero, one, or more choices such that two or more choices may populate the cell simultaneously. The choices may be sub-entities of the table contained within the choice type column.

At operation 1030, the collaboration database engine may be configured to enable the set of symbols and associated text values corresponding to the choices to be modified. For example, the collaboration database engine may be configured to enable selection of a different symbol and/or associated text value, disable one of a symbol and associated text value, enable deletion of one of the choices through disablement of both a symbol and associated text value corresponding to the choice to be deleted, and enable creation of a new choice through selection of a new symbol and associated text value corresponding to the new choice. In some embodiments, the modifications made to the set of symbols and associated text values may be tracked to facilitate machine-based learning and subsequent adjustment in future automatic selections performed by the collaboration database engine.

At operation 1040, the collaboration database engine may then be configured to provide the choice type column for display within the table through the application such that each cell of the choice type column is populated with at least one of the choices. In one embodiment, the collaboration database engine may be configured to provide the choice type column for display within the table such that the choices are manually selectable by a user to populate each cell of the choice type column with at least one of the choices. Alternatively, the collaboration database engine may be configured to provide the choice type column for display within the table such that each cell of the choice type column is automatically populated with at least one of the choices based on data retrieved from other services associated with the collaboration database service. Each choice may be represented by a symbol and/or associated text value from the modified set of symbols and associated text values that correspond to that choice. In some embodiments, the choice contained within each cell of the choice type column may be aggregated.

The operations included in process 1000 are for illustration purposes. Single and/or multi-choice data presentation through a collaboration database service may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some embodiments, a means for choice data presentation through a collaboration database service may be provided, where the means may include detecting creation and/or modification of a table through an application associated with the collaboration database service, where the table comprises one or more columns and rows configured as entities of the table. The means may also include automatically selecting a set of symbols and associated text values corresponding to choices to provide for display through the application in response to a request to add a choice type column to the table, where the choices may be configured as sub-entities of the table contained within the choice type column. The means may further include enabling modification of the set of symbols and associated text values corresponding to the choices through the application, and providing the choice type column for display within the table through the application such that each cell of the choice type column is populated with at least one of the choices, where the at least one choice may be represented by a symbol and/or associated text value from the modified set of symbols and associated text values that corresponds to the at least one choice.

According to some examples, a method for choice data presentation through a collaboration database service may be provided. An example method may include detecting creation and/or modification of a table through an application associated with the collaboration database service, where the table comprises one or more columns and rows configured as entities of the table. The method may also include automatically selecting a set of symbols and associated text values corresponding to choices to provide for display through the application in response to a request to add a choice type column to the table, where the choices may be configured as sub-entities of the table contained within the choice type column. The method may further include enabling modification of the set of symbols and associated text values corresponding to the choices through the application, and providing the choice type column for display within the table through the application such that each cell of the choice type column is populated with at least one of the choices, where the at least one choice may be represented by a symbol and/or associated text value from the modified set of symbols and associated text values that corresponds to the at least one choice.

In other examples, the choice type column may be provided for display within the table such that the choices may be manually selectable by a user to populate each cell of the choice type column with the at least one choice. The choice type column may be provided for display within the table such that each cell of the choice type column may be automatically populated with the at least one choice, where data associated with the choices may be retrieved from one or more services associated with the collaboration database service to automatically populate each cell of the choice type column with the at least one choice. Enabling modification of the set of symbols and associated text values corresponding to the choices may include enabling selection of one or more of a different symbol and associated text value corresponding to a choice, disabling one of a symbol and associated text value corresponding to a choice, enabling a choice to be deleted through disablement of both the symbol and associated text value corresponding to the choice, and enabling a new choice to be added through selection of a new symbol and associated text value corresponding to the new choice.

In further examples, modifications made to the automatically selected set of symbols and associated text values corresponding to the choices may be tracked. In response to the request to add the choice type column to the table, the choice type column may be configured as a single choice type column or a multi-choice type column. Conversion of the choice type column from a single choice type column to a multi-choice type column, or conversion of the choice type column from a multi-choice type column to a single choice type column may be enabled. A warning message to be displayed through the application may be provided in response to detecting a user selection to convert the choice type column. Modification of the choice type column provided for display may be enabled, and may include renaming a title of the choice type column, filtering the choice type column based on the choices, reordering the choice type column based on a preferred order of the choices, and deleting the choice type column.

According to some embodiments, a server to present choice data through a collaboration database service may be described. An example server may include a communication interface configured to facilitate communication between the collaboration database service and one or more other services, a memory configured to store instructions, and one or more processors coupled to the memory. The processors may be configured to execute, in conjunction with the instructions stored in the memory, a collaboration database engine integrated with the collaboration database service. The collaboration database engine may be configured to detect creation and/or modification of a table through an application associated with the collaboration database service, where the table comprises one or more columns and rows configured as entities of the table. The collaboration database engine may also be configured automatically select a set of symbols and associated text values corresponding to choices to provide for display through the application in response to a request to add a choice type column to the table, where the choices may be configured as sub-entities of the table contained within the choice type column. The collaboration database engine may be further configured to enable modification of the set of symbols and associated text values corresponding to the choices through the application, and provide the choice type column for display within the table through the application such that each cell of the choice type column is populated with at least one of the choices, where the at least one choice may be represented by a symbol and/or associated text value from the modified set of symbols and associated text values that corresponds to the at least one choice.

In other embodiments, a symbol may be a glyph and/or an emoji. The at least one choice populating each cell of the choice type column may be aggregated to determine a percentage of each choice within the choice type column. Data associated with the choices may be retrieved from the one or more services through the communication interface to automatically populate each cell of the choice type column with the at least one choice, where the services may include another database service, a Global Positioning Service (GPS), a scheduling service, and a presence service. The set of symbols and associated text values corresponding to the choices may be automatically selected based on a type of data within the table, users associated with the table, whether the choice type column is configured a single or multi-choice type column, other choice type columns contained within the table, recent modifications made to the table, and/or other tables created containing similar data.

According to some examples, a mobile computing device to display a choice data presentation from a collaboration database service may be described. An example mobile computing device may include a memory configured to store instructions, and one or more processors coupled to the memory. The processors may be configured to execute, in conjunction with the instructions stored in the memory, an application associated with the collaboration database service. The application may be configured to display a user experience to enable creation and/or modification of a table, where the table may include one or more columns and rows configured as entities of the table. In response to a request to add a choice type column to the table through the user experience, the application may be configured to receive an automatically selected set of symbols and associated text values corresponding to choices from the collaboration database service to display through the user experience, where the choices may be configured as sub-entities of the table contained within the choice type column. The application may also be configured to enable modification of the set of symbols and associated text values corresponding to the choices through the user experience, and display the choice type column within the table through the user experience. Each cell of the choice type column may be populated with at least one of the choices, and the at least one choice may be represented by a symbol and/or associated text value from the modified set of symbols and associated text values that corresponds to the at least one choice.

In other examples, the choice type column may be displayed within the table such that the choices may be manually selectable by a user to populate each cell of the choice type column with the at least one choice, and/or each cell of the choice type column may be automatically populated with the at least one choice. The application is a collaboration database application and a productivity application comprising one or more of word-processing application, a spreadsheet application, a presentation application, and/or a notebook application.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method for choice data presentation through a collaboration database service, the method comprising:
   detecting one of creation and modification of a table through an application associated with the collaboration database service, wherein the table comprises one or more columns and rows configured as entities of the table;
   in response to a request to add a choice type column to the table, automatically selecting a set of symbols and associated text values corresponding to choices to provide for display through the application based on a type of data within the table, wherein the choices are configured as a plurality of sub-entities of the table contained within the choice type column;
   enabling modification of the automatically selected set of symbols and associated text values corresponding to the choices through the application thereby creating a modified set of symbols and associated text values, wherein the symbols are glyphs and/or emojis; and
   providing the choice type column for display within the table through the application such that each cell of the choice type column is populated with at least one of the choices based on a value of that cell, wherein the at least one of the choices is represented by a symbol and associated text value from the modified set of symbols and associated text values that corresponds to the at least one of the choices.

2. The method of claim 1, further comprising:
providing the choice type column for display within the table such that the choices are manually selectable by a user to populate each cell of the choice type column with the at least one of the choices.

3. The method of claim 1, further comprising:
providing the choice type column for display within the table such that the choices which populate each cell of the choice type column are automatically selected by a collaboration database engine.

4. The method of claim 3, further comprising:
retrieving data associated with the choices from one or more services associated with the collaboration database service to automatically populate each cell of the choice type column with the at least one of the choices.

5. The method of claim 1, wherein enabling modification of the automatically selected set of symbols and associated text values corresponding to the choices comprises one or more of:
enabling selection of one or more of a different symbol and associated text value corresponding to a choice;
disabling one of a symbol and associated text value corresponding to a choice;
enabling a choice to be deleted through disablement of both the symbol and associated text value corresponding to the choice; and
enabling a new choice to be added through selection of a new symbol and associated text value corresponding to the new choice.

6. The method of claim 5, further comprising:
tracking modifications made to the automatically selected set of symbols and associated text values corresponding to the choices.

7. The method of claim 1, further comprising:
in response to the request to add the choice type column to the table, configuring the choice type column as one of a single choice type column, wherein at most a single choice populates a cell or a multi-choice type column, wherein two or more choices populate a cell simultaneously.

8. The method of claim 7, further comprising:
enabling one of: conversion of the choice type column from a single choice type column to a multi-choice type column, and conversion of the choice type column from a multi-choice type column to a single choice type column.

9. The method of claim 8, further comprising:
in response to detecting a selection to convert the choice type column, providing a warning message indicating potential data loss to be displayed through the application.

10. The method of claim 1, further comprising enabling modification of the choice type column provided for display, wherein enabling modification of the choice type column provided for display comprises:
renaming a title of the choice type column;
filtering the choice type column based on the choices;
reordering the choice type column based on a preferred order of the choices; and
deleting the choice type column.

11. The method of claim 1, further comprising:
aggregating the at least one of the choices populating each cell of the choice type column to determine a percentage of each choice within the choice type column.

12. A server to present choice data through a collaboration database service, the server comprising:
a communication interface configured to facilitate communication between the collaboration database service and one or more other services;
a memory configured to store instructions; and
one or more processors coupled to the memory, the one or more processors configured to execute, in conjunction with the instructions stored in the memory, a collaboration database engine integrated with the collaboration database service, wherein the collaboration database engine is configured to:
detect one of creation and modification of a table through an application associated with the collaboration database service, wherein the table comprises one or more columns and rows configured as entities of the table;
in response to a request to add a choice type column to the table, automatically select a set of symbols and associated text values corresponding to choices to provide for display through the application based on a type of data within the table, wherein the choices are configured as a plurality of sub-entities of the table contained within the choice type column;
enable modification of the automatically selected set of symbols and associated text values corresponding to the choices through the application thereby creating a modified set of symbols and associated text values; and
provide the choice type column for display within the table through the application such that each cell of the choice type column is populated with at least one of the choices based on a value of that cell, wherein the at least one of the choices is represented by a symbol and associated text value from the modified set of symbols and associated text values that corresponds to the at least one of the choices.

13. The server of claim 12, wherein the symbol comprises one of a glyph and/or an emoji.

14. The server of claim 12, wherein the collaboration database engine is further configured to:
aggregate the at least one of the choices populating each cell of the choice type column to determine a percentage of each choice within the choice type column.

15. The server of claim 12, wherein the collaboration database engine is further configured to:
retrieve data associated with the choices from the one or more other services through the communication interface to automatically populate each cell of the choice type column with the at least one of the choices.

16. The server of claim 12, wherein the one or more other services include another database service, a Global Positioning Service (GPS), a scheduling service, and a presence service.

17. The server of claim 16, wherein the collaboration database engine is configured to automatically select the set of symbols and associated text values corresponding to the choices further based on one or more of users associated with the table, whether the choice type column is configured a single choice type column or multi-choice type column, other choice type columns contained within the table, recent modifications made to the table, and other tables created containing similar data.

18. A mobile computing device to display a choice data presentation from a collaboration database service, the mobile computing device comprising:

a memory configured to store instructions; and
one or more processors coupled to the memory, the one or more processors configured to execute, in conjunction with the instructions stored in the memory, an application associated with the collaboration database service, wherein the application is configured to:
display a user experience to enable one of creation and modification of a table, wherein the table comprises one or more columns and rows configured as entities of the table;
in response to a request to add a choice type column to the table through the user experience, receive an automatically selected set of symbols and associated text values corresponding to choices from the collaboration database service to display through the user experience, wherein the choices are based on a type of data within the table and configured as a plurality of sub-entities of the table contained within the choice type column;
enable modification of the automatically selected set of symbols and associated text values corresponding to the choices through the user experience thereby creating a modified set of symbols and associated text values; and
display the choice type column within the table through the user experience, wherein each cell of the choice type column is populated with at least one of the choices based on a value of that cell, and the at least one of the choices is represented by a symbol comprising one of a glyph and/or an emoji from the modified set of symbols that corresponds to the at least one of the choices.

19. The mobile computing device of claim 18, wherein the choice type column is displayed within the table such that one of: the choices are manually selectable by a user to populate each cell of the choice type column with the at least one of the choices, and each cell of the choice type column is automatically populated with the at least one of the choices.

20. The mobile computing device of claim 18, wherein the least one of the choices is further represented by associated text values that corresponds to the at least one of the choices.

* * * * *